(12) United States Patent
Kato

(10) Patent No.: US 9,129,091 B2
(45) Date of Patent: Sep. 8, 2015

(54) CONTENT MANAGEMENT DEVICE AND CONTENT MANAGEMENT METHOD

(75) Inventor: Taisuke Kato, Tokyo (JP)

(73) Assignee: NGB CORPORATION, Tokyo (JP)

( * ) Notice: Subject to any disclaimer, the term of this patent is extended or adjusted under 35 U.S.C. 154(b) by 301 days.

(21) Appl. No.: 13/378,736

(22) PCT Filed: Jun. 18, 2010

(86) PCT No.: PCT/JP2010/060391
§ 371 (c)(1),
(2), (4) Date: Dec. 16, 2011

(87) PCT Pub. No.: WO2010/147221
PCT Pub. Date: Dec. 23, 2010

(65) Prior Publication Data
US 2012/0099589 A1   Apr. 26, 2012

(30) Foreign Application Priority Data
Jun. 19, 2009   (JP) .................. 2009-146705

(51) Int. Cl.
*H04L 12/701* (2013.01)
*H04L 12/801* (2013.01)
(Continued)

(52) U.S. Cl.
CPC .............. *G06F 21/10* (2013.01); *H04L 45/306* (2013.01); *H04L 63/10* (2013.01); *H04L 65/4076* (2013.01); *H04L 67/327* (2013.01); *H04L 69/22* (2013.01); *H04L 2463/101* (2013.01)

(58) Field of Classification Search
CPC ...... H04L 45/00; H04L 47/10; H04L 29/0653
USPC ................................. 370/389, 392
See application file for complete search history.

(56) References Cited

U.S. PATENT DOCUMENTS 6,108,708 A * 8/2000 Iwata ........................... 709/238
6,374,112 B1 * 4/2002 Widegren et al. .......... 455/452.2
(Continued)

FOREIGN PATENT DOCUMENTS

| CN | 101420375 A | 4/2009 |
|---|---|---|
| JP | 2000-156676 A | 6/2000 |

(Continued)

OTHER PUBLICATIONS

International Search Report [PCT/ISA/210], dated Aug. 17, 2010, from the International Searching Authority, issued in International Application No. PCT/JP2010/060391.
(Continued)

*Primary Examiner* — Ronald B Abelson
(74) *Attorney, Agent, or Firm* — Sughrue Mion, PLLC

(57) ABSTRACT

Content data 30 are distributed from a content distribution device 11 to a content reproduction device 12 by way of a network 10. The content data 30 are transmitted as a content packet 31, like an IP packet, on the network 10. Packet route information 34 that includes address information about a packet source and a relay point and the like, and shows a packet transmission route on the network is stored in a header 32 of the content packet 31. A content management device 15 acquires the packet route information 34 about the content packet 31 and identifies a specific content corresponding to the packet route information according to preset content-route correspondence information showing a correlation between a content and a route, thereby performing management of a content according to a result of identification.

38 Claims, 18 Drawing Sheets

(51) Int. Cl.
*H04L 29/06* (2006.01)
*G06F 21/10* (2013.01)
*H04L 12/725* (2013.01)
*H04L 29/08* (2006.01)

(56) References Cited

U.S. PATENT DOCUMENTS

| | | | |
|---|---|---|---|
| 2002/0021680 A1* | 2/2002 | Chen | 370/331 |
| 2002/0114466 A1 | 8/2002 | Tanaka et al. | |
| 2003/0039245 A1* | 2/2003 | Khosravi et al. | 370/389 |
| 2003/0039249 A1* | 2/2003 | Basso et al. | 370/394 |
| 2003/0091031 A1* | 5/2003 | Kuhlmann et al. | 370/352 |
| 2003/0103465 A1* | 6/2003 | Counterman | 370/252 |
| 2003/0140009 A1* | 7/2003 | Namba et al. | 705/59 |
| 2003/0159033 A1 | 8/2003 | Ishiguro | |
| 2004/0003253 A1* | 1/2004 | Ogino et al. | 713/176 |
| 2005/0058068 A1* | 3/2005 | Ben Ali et al. | 370/230 |
| 2005/0198351 A1* | 9/2005 | Nog et al. | 709/232 |
| 2005/0267986 A1* | 12/2005 | Murakami et al. | 709/238 |
| 2007/0044159 A1 | 2/2007 | Ishiguro | |
| 2007/0248103 A1 | 10/2007 | Delaney et al. | |
| 2007/0289025 A1 | 12/2007 | Tanaka et al. | |
| 2009/0144819 A1* | 6/2009 | Babbar et al. | 726/13 |
| 2009/0185527 A1* | 7/2009 | Akhtar et al. | 370/329 |
| 2010/0106874 A1* | 4/2010 | Dominguez et al. | 710/260 |
| 2010/0211689 A1 | 8/2010 | Bijwaard et al. | |

FOREIGN PATENT DOCUMENTS

| | | |
|---|---|---|
| JP | 2003-216503 A | 7/2003 |
| JP | 2005-176312 A | 6/2005 |
| JP | 2006-260515 A | 9/2006 |
| JP | 2008-021273 A | 1/2008 |
| JP | 2008-543135 A | 11/2008 |

OTHER PUBLICATIONS

N. Uchida, et al., "Terminal Software Capable of Making a Reference to or Mangaing Copy Right Information Embedded in a Content", Research Paper of Information Processing Society of Japan, vol. 2002, No. 85 (DPE-109 EIP-17), Sep. 12, 2002, pp. 47-50.

Office Action, dated Mar. 5, 2014, issued by the State Intellectual Property Office of the People's Republic of China in counterpart Chinese Application No. 201080036980.0.

* cited by examiner

FIG. 14

| CONTENT ROUTE INFORMATION (111) | CONTENT ID (112) | CONTENT-RELATED INFORMATION (113) | CONTENT DATA SIZE (114) |
|---|---|---|---|
| 1234:5678::1234:0:0:9abc, 49152<br>5678:9abc::1234:0:0:0001, 49152 | AB0001 | \<IMPLEMENTER\><br>\<TITLE\><br>\<COPY RIGHT INFORMATION\> | 15600 |
| 1234:9abc::1234:0:0:1234, 49161<br>5678:9abc::1234:0:0:0002, 49161 | JK0035 | \<IMPLEMENTER\><br>\<TITLE\><br>\<COPY RIGHT INFORMATION\> | 368200 |
| ⋮ | ⋮ | ⋮ | ⋮ |

FIG. 15

| CONTENT ID (121) | CONTENT INDEX INFORMATION (122) | USAGE VOLUME (THE NUMBER OF CONTENT USED) (123) | TIME INFORMATION (124) | COPY RIGHT INFORMATION (125) |
|---|---|---|---|---|
| AB0001 | \<IMPLEMENTER\><br>\<TITLE\> | 8520 | 2009/04/28<br>19:20:30 | \<SPECIFICS OF COPY RIGHT\><br>\<USAGE CHARGE INFORMATION\> |
| JK0035 | \<IMPLEMENTER\><br>\<TITLE\> | 15365 | 2009/05/09<br>11:45:50 | |
| ⋮ | ⋮ | ⋮ | ⋮ | ⋮ |

FIG. 17

| CONTENT ID (121) | CONTENT INDEX INFORMATION (122) | USAGE VOLUME (THE NUMBER OF CONTENT USED) (123) | USAGE RANKING INFORMATION (126) | COPY RIGHT INFORMATION (125) |
|---|---|---|---|---|
| CS0104 | <IMPLEMENTER> <TITLE> | 21339 | 1 | <SPECIFICS OF COPY RIGHT> <USAGE CHARGE INFORMATION> |
| JK0035 | <IMPLEMENTER> <TITLE> | 15365 | 2 | <SPECIFICS OF COPY RIGHT> <USAGE CHARGE INFORMATION> |
| ⋮ | ⋮ | ⋮ | ⋮ | ⋮ |
| JK0035 | <IMPLEMENTER> <TITLE> | 8520 | 17 | <SPECIFICS OF COPY RIGHT> <USAGE CHARGE INFORMATION> |
| ⋮ | ⋮ | ⋮ | ⋮ | ⋮ |

…

CONTENT MANAGEMENT DEVICE AND CONTENT MANAGEMENT METHOD

TECHNICAL FIELD

The present invention relates to a content management device and a content management method for managing a usage situation of contents, like music, a moving image, a still image, and a text.

BACKGROUND ART

Contents, like music, a moving image, a still image, and a text, that are in the form of analogue information are on their way to becoming handled as digitized data in a large portion of cases. A digital content of this type is not only used as its content itself but also as a content including a main body of the content and a program having a function of reproducing the content, or a game software content and the like.

The number of chances of a content being utilized by a network is also increasing with the advance of a network like the Internet. A system that is recently on its own way to become prevalent downloads a content by a network through use of an electronic device having a communication function, like a personal computer (PC), a portable phone terminal, a smart-phone, a portable information terminal, a game terminal, and a music playing terminal and utilizes the downloaded content.

A method for protecting copy right of a content by means of embedding copy right information in the main body of content data has been adopted as example management of copy right in connection with usage of a content. A method for adding copy right information includes a method for embedding a content ID into content data by use of an electronic watermark technique, or the like, a method for adding content information, like a DCD (Distributed Content Descriptor), into a content header, and others (see; for instance, Non-Patent Document 1).

In relation to management of copy right of a content, there has also been proposed a data communication system that stores information for identifying a proprietor into a header of content data and that allows only an authorized proprietor to reproduce a content, thereby protecting profits of a copy right holder (see; for instance, Patent Document 1). In order to safely distribute a digital content, another proposed system (see; for instance, Patent Document 2) sends a content to a user in an encrypted form; and decrypts and reproduces the encrypted content data by using key information and user authority information.

As a method for controlling communication over the network, there is a method controlling a connection between a sender and a receiver, to thus enable transmission of multimedia data by use of call control, like an SIP (Session Initiation Protocol). Proposed systems employing an SIP include a system that enables performance of transfer control according to header information, a system that enables billing of a phone or digital data, and the like (see; for instance, Patent Documents 3 and 4).

RELATED ART DOCUMENTS

Patent Documents

Patent Document 1: JP-A-2003-216503
Patent Document 2: JP-A-2000-156676
Patent Document 3: JP-T-2008-543135
Patent Document 4: US2007/0248103

Non-Patent Document

Non-Patent Document: co-authors—Noriyoshi UCHIDA, Naoki KOBAYASHI, Hiroshi SEKIYA, Hidekazu ICHIKU, Sueki MATSUMURA "The Terminal Software refer to and manage rights ownership attributes embedding in the package" Research Paper of Information Processing Society of Japan, Vol. 2002, No. 85 (DPS-109 EIP-17), Sep. 12, 2002, pp. 47-50

DISCLOSURE OF THE INVENTION

Problem that the Present Invention is to Solve

A content management device that manages copy right, or the like, is designed so as to store management information, like copy right information, in the main body of content data or a header of the content data and thus manage the stored management information. Because of this, the main body of the content and the management information are indivisible, and a program or protocol specifically designed to transfer content must be used. A source of content distribution must manage everything. It is necessary to perform maintenance on and management of management information, or the like. On this occasion, content management becomes an integrated fashion. Difficulty is encountered in figuring out a usage situation, or the like, of a content that is once distributed by the source of content distribution.

An usage pattern for a content have become diversified along with proliferation of digital contents. With regard to content management, like copy right management, a method that is applicable to various usage patterns has hitherto been required. Content distributors and administrators are seeking for management methods fit for respective usage patterns. However, the related art content management device needs to add management information to content data itself or use a custom-designed program or protocol or the like. To adapt the related art content management device to various usage patterns, there are problems in time and efforts consumed by content management, an increased cost and the like. Moreover, depending on nature of usage patterns, there is difficulty in applying the content management device to the usage pattern.

The present invention has been conceived in light of the circumstances and aims at providing a content management device and a content management method that enable a general purpose system to grasp a usage situation of a content and that are easily applied to various usage patterns.

Means for Solving the Problem

There is provided a content management device that manages a usage situation of a content which is transmitted over a network as a content packet into which content data including a content are packetized, the device comprising:

a route information acquisition section that acquires packet route information including, as information that is included in the content packet and that shows a packet transmission route in the network, at least any one of source information including address information about a packet source and additional route information including address information about a relay point in the packet transmission route; and a content identification section that identifies a specific content corresponding to packet route information according to the acquired packet route information and preset content-route correspondence information showing a correlation between a content and a route.

There is provided a content distribution device that distributes a content which is transmitted over a network as a content packet into which content data including a content are packetized, the device comprising:

a distribution control section that transmits a content packet packetized by including content data including a target content to be distributed, to a predetermined destination;

a route information setting section that sets, in the header of the content packet as information for specifying a route for a specific packet corresponding to the content packet, route information including address information about at least any one of a source and a relay point in a packet transmission route; and an output section that outputs the content packet.

The present invention provides a content relay that relays a content which is transmitted over a network as a content packet into which content data including a content are packetized, the relay comprising:

an input/output section that performs inputting and outputting of the content packet;

a route control section that controls transmission of the content packet to a destination on a predetermined route according to destination information stored in a header of the received content packet and route control information previously set in the content relay; and a route information adding section that imparts, as packet route information showing a packet transmission route in the network, information including address information about a relay point of the content relay to the header of the content packet.

There is provided a content relay that relays a content which is transmitted over a network as a content packet into which content data including a content are packetized, the relay comprising:

an input/output section that performs inputting and outputting of the content packet; and a route control section that controls transmission of the content packet to a destination on a predetermined route according to destination information stored in a header of the received content packet and packet route information showing a packet transmission route in the network.

By means of the configuration, packet route information included in the content packet is acquired, and it is possible to identify a specific content corresponding to packet route information according to the acquired packet route information and present content-route correspondence information showing a correlation between a content and a route. As a consequence, content management becomes possible without necessity for use of a technique for adding management information to content data themselves or using a custom-designed program or protocol. For instance, it becomes possible even for a general-purpose system, like a system using an IP network for transmitting IP packets, to grasp a usage situation of a content, like acquisition of a usage volume of an identified, specific content.

BRIEF DESCRIPTION OF THE DRAWINGS

FIG. 14 is a table showing example content-route correspondence information in the embodiment of the present invention.

FIG. 15 is a table showing example content usage information of the embodiment of the present invention.

FIG. 17 is a table showing example rankings of content usage of the embodiment of the present invention.

EMBODIMENT FOR IMPLEMENTING THE PRESENT INVENTION

An embodiment provided below shows an example configuration and its operation achieved by a content management device configured as follows. Specifically, the content management device is configured so as to be compatible with a network including at least one of the followings; namely, a WAN (Wide Area Network) like the Internet, a public line network like a fixed phone line or a mobile communication network, a broadcast network capable of effecting digital communication like a cable TV and a digital broadcast, a communication network using a private line, an Intranet established by a specified business entity, a LAN (Local Area Network) established at a depot, and various wired or wireless networks. The network employed in the present embodiment is assumed to be able to perform packet communication using a general purpose protocol, like an IP (Internet Protocol). Explanations are now given, by way of example, on the assumption that a commonly proliferated IP network would be available. The present invention can also be applied to a network using another protocol.

[Example Basic Configuration]

Figure 1:
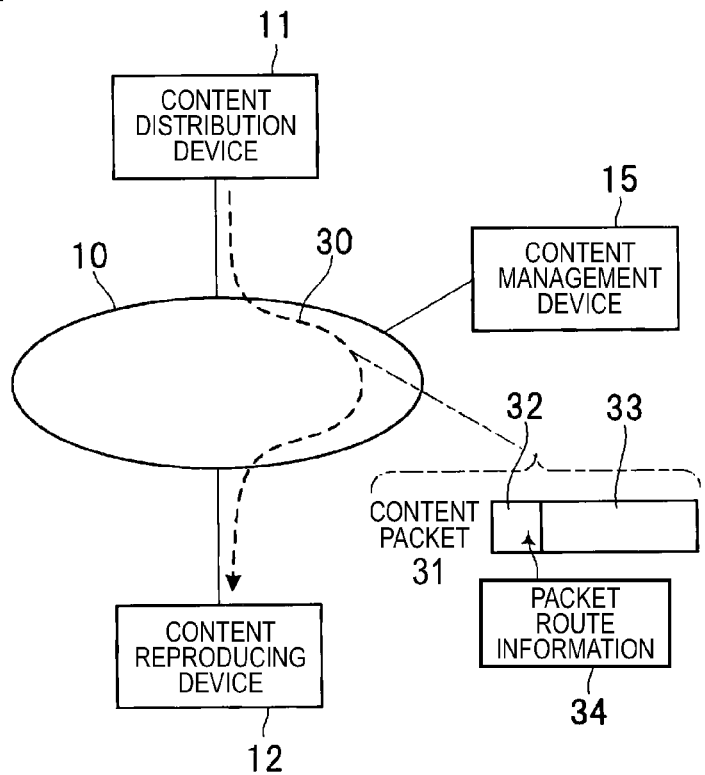
FIG. 1 is a configuration diagram showing a first example configuration of a content management device of an embodiment of the present invention.

FIG. 1 is a configuration diagram showing a first example configuration of a content management device of an embodiment of the present invention. The content management device of the present embodiment has a content distribution device 11 that distributes contents; a content reproducing device 12 that receives the distributed content and that reproduces the received content; and a content management device 15 that manages a usage situation of a content, or the like. These devices are connected to a network 10.

The content distribution device 11 is composed of a server including an information processing device, like a computer having a processor, memory, and others. The content distribution device 11 distributes content data including a digital data content to the content reproducing device 12 by the network 10. The content distribution device 11 may have a storage that stores content data or may also be configured so as to read, as required, target content data stored in other storage and distribute the read content data. A functional configuration and operation of the content distribution device 11 will be described in detail later. An implementer or a right holder of a content or an administrator who manages distribution of contents at respective depots in a network, like a communication business entity or a network provider that provides service for making a connection to a network or a communication line, a service provider that provides various content-related services, and others, can operate the content distribution device 11.

A word "content" employed herein is assumed to mean a content (a digital content) that represent music, a moving image, a static image, a text, and the like, and that can be transmitted as digital data. In addition to including a data main body to be represented, the content data are assumed to encompass a content including a data main body and a program having a function of reproducing the data main body or a content including, as a subject, a program like game software or a program of another application.

The content reproducing device 12 is composed of any of various electronic devices having communication capabilities, like a personal computer (PC), a portable phone terminal, a smart-phone, a portable information terminal, a game terminal, a music playing terminal, a digital recorder, a digital broadcast TV, a set-top box for a digital broadcast, and others. It is also possible to provide the content management device with a content receiver in place of the content reproducing device, to receive a distributed content, and to reproduce the content by means of another reproducing device.

The content management device 15 is composed of an information processing device, like a computer having a processor, memory, and the like. The content management device 15 acquires and stores a usage situation of digital data content and performs content management like copy right management, or the like. A functional configuration and operation of the content management device 15 is described in detail later. The content management device 15 can be composed of a gateway for connecting a network, a router, a firewall, an access management server, a relay server, or the like. Accordingly, an implementer or a right holder of a content or an administrator who manages distribution of contents at respective depots in a network, like a communication business entity or a network provider that provides service for making a connection to a network or a communication line, a service provider that provides various content-related services, and others, can operate the content management device 15.

The administrator that is the same as who manages the content distribution device 11 or another administrator can operate the content management device 15. The content management device 15 may also be provided at a plurality of locations in the network 10. Moreover, some or all of the capabilities of the content management device 15 can also be provided to a content reproducing device, a content receiver, or the like, disposed for a content user.

As mentioned above, the network 10 is assumed to include at least one of the followings; namely, a WAN like the Internet, a public line network like a fixed phone line or a mobile communication network, a broadcast network capable of effecting digital communication like a cable TV and a digital broadcast, a communication network using a private line, LANs established at respective depots, and various wired or wireless networks. The network 10 can perform packet communication and is configured so as to be able to configure an IP network that transmits an IP packet. For instance, the network can be applied to a system that distributes contents, like music, a moving image, a photograph, an illustration, a text, and the like, through downloading or streaming and by use of the Internet or a cell phone network; a system that performs simultaneous or on-demand distribution of a broadcast program utilizing various communication networks; or the like.

Content data 30 transmitted from the content distribution device 11 are transmitted over the network 10 in the form of a content packet 31 that is a packet including the content data and arrive at and are received at the content reproducing device 12. In the embodiment, the content packet 31 is assumed to be a packet belonging to a hierarchical layer that is lower than an upper hierarchical layer, like an application layer of an OSI (Open Systems Interconnection) reference model of the network; specifically, a packet belonging to a third layer (a network layer) and a fourth layer (a transport layer). Specifically, the content packet 31 is basically composed of an IP packet of a network layer in the example IP network and transmitted by means of TCP/IP communication utilizing a TCP (Transmission Control Protocol) of a transport layer, UDP/IP communication utilizing an UDP (User Datagram Protocol), or the like. In higher hierarchical layers from a session layer to an application layer, communication of content data compatible with various protocols is possible. In a lower hierarchical layer; that is, the transport layer, the content data are encapsulated as a TCP or UDP packet and transmitted as an IP packet in the network layer. The network 10 can also be applied to a system that performs encrypted communication by forming an encrypted communication route between predetermined nodes by use of an IPsec (Security Architecture for Internet Protocol), a system that encrypts data in a payload of an IP packet and transmits the encrypted data, or the like.

The content packet 31 is composed of a header 32 and a payload 33. In the present embodiment, the header 32 of the content packet 31 is assumed to include packet route information 34. The packet route information 34 includes address information that pertains to at least one of a packet source and a relay point and that shows a packet transmission route in the network 10. In the example IP network, one or more IP addresses pertaining to a source and a relay point is stored. The packet route information 34 can also be made so as to include address information about at least one relay point of the content packet 31 on the network 10 or address information about a source and a relay point. The packet route information 34 can also include, as a history of nodes in the network which the content packet 31 has passed through, a permutation of pieces of address information. In the example IP network, IP addresses and port information are used as address information about a source, a relay point, and a destination. Therefore, the port information can also be used as address information along with the IP addresses. Depending on a network configuration, a global IP address or a private IP address is used for the IP address, as required. A MAC (Media Access Control) address can also be used as address information about a source, a relay point, and a destination.

In the content management device of the present embodiment, the content management device 15 identifies a content according to correspondence information (content-route correspondence information) that correlates a packet transmission route with a content, by use of the packet route information 34 about the content packet 31. So long as the packet transmission route is correlated with a content, the content packet 31 passed through a specific route can be deemed to be a specific content. Consequently, the content packet 31 with the specific packet route information 34 is deemed to be a specific content, and transmission of the specific content is recognized by detection of transmission of the content packet 31. Specifically, in relation to transmission of a content by way of a network, a content packet is assumed to be nearly equal to content data (an IP packet is assumed to be nearly equal to content data in the example IP network). Content management is implemented by acquisition and determination of a route and capacity for transmitting a content packet.

[Example Configuration of a Packet]

Figure 2:
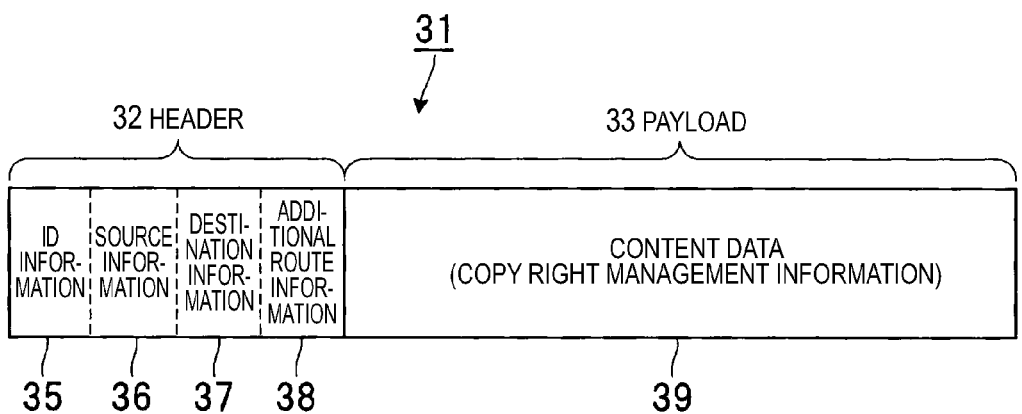
FIG. 2 is a diagram showing an example packet configuration of a content packet employed in the embodiment of the present invention.

FIG. 2 is a diagram showing an example packet configuration of the content packet 31 employed in the embodiment of the present invention. The header 32 of the content packet 31 stores ID information 35, source information 36, destination information 37, and additional route information 38 about the packet. The source information 36 is address information about a source of the content packet 31, and the destination information 37 is address information about a destination (a direction of transmission) of the content packet 31. The additional route information 38 is route information including address information about a relay point in the packet transmission route. The additional route information 38 includes at least any one of actual transmission route information showing a transmission route over which a packet was actually transmitted, designated route information for designating a packet transmission route, and route control information for directing a packet transmission route. At least either the source information 36 or the additional route information 38 in the content packet 31 is hereunder assumed to be used as the packet route information 34. Since the additional route information 38 can include source address information, only the additional route information 38 may also be used as the packet route information 34.

Content data 39 pertaining to the body of a content are stored in the payload 33 of the content packet 31. Copy right management information for copy right management, including DRM (Digital Rights Management), can also be added to the content data 39, and copy right management, or the like, can also be performed by means of a protocol or a program in a higher hierarchical layer of the network. In this case, it is possible to configure, as necessarily, a system that performs, in a combined fashion, content management using the route information described in connection with the embodiment with content management, like copy right management, involving use of a protocol or a program belonging to a higher hierarchical layer and use of management information.

In place of use of the packet route information 34, such as that mentioned above, another conceivable method is to store ID information about a content in the header 32 of the content packet 31. However, when arbitrary information is stored in the header of the packet in the manner as mentioned above, there is no guarantee that the stored information in the entire communication route can be held, and a content cannot be identified in some cases. Since the correlation between the ID information in the header and the nature of a body of a content in the payload is not necessarily guaranteed, reliability of a result of content identification decreases in some cases.

Figure 3:
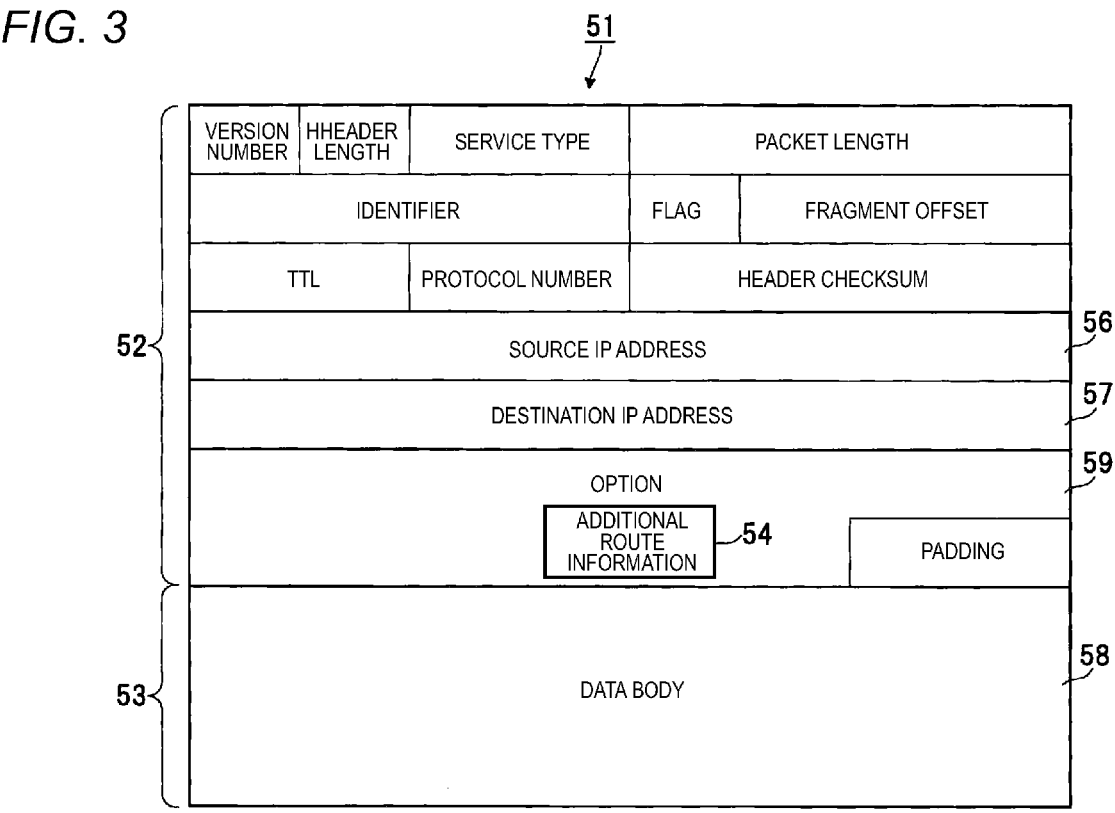
FIG. 3 is a diagram showing an example packet configuration applied to an IPv4 packet as a first example content packet of the embodiment.

FIG. 3 is a diagram showing an example packet configuration applied to an IPv4 packet as a first example content packet of the embodiment. An IP packet 51 of the first example conforms to IPv4. A header 52 includes various types of information; namely, a version number, a header length, a service type, a packet length, an identifier, a flag, a fragment offset, a TTL, a protocol number, and a header check sum. The header 52 stores a source IP address 56 and a destination IP address 57. Additional route information 54 is stored in an optional field 59 of the header 52. When the optional field 59 is used and when the length of the header 52 does not come to an integral multiple of 32 bits, a padding field having a variable length for adjusting the number of bits is added to the header. A main body data 58 including content data are stored in a payload 53 of the IP packet 51. Such a packet format conforming to IPv4 is defined by RFC 791, or the like. In the optional field 59, it is possible to add designated route information for previously designating a packet route, route control information for performing route control by indicating a packet transmission route, and record actual transmission route information over which a packet was actually transmitted. In the embodiment, the additional route information 54 is added by use of the optional field 59. Packet route information is acquired by reference to the additional route information 54 stored in the optional field 59, thereby identifying a specific content. So long as packet transmission route information and packet route control information are used in combination in connection with the additional route information 54, an arbitrary route can also be associated with a content.

Figure 4:
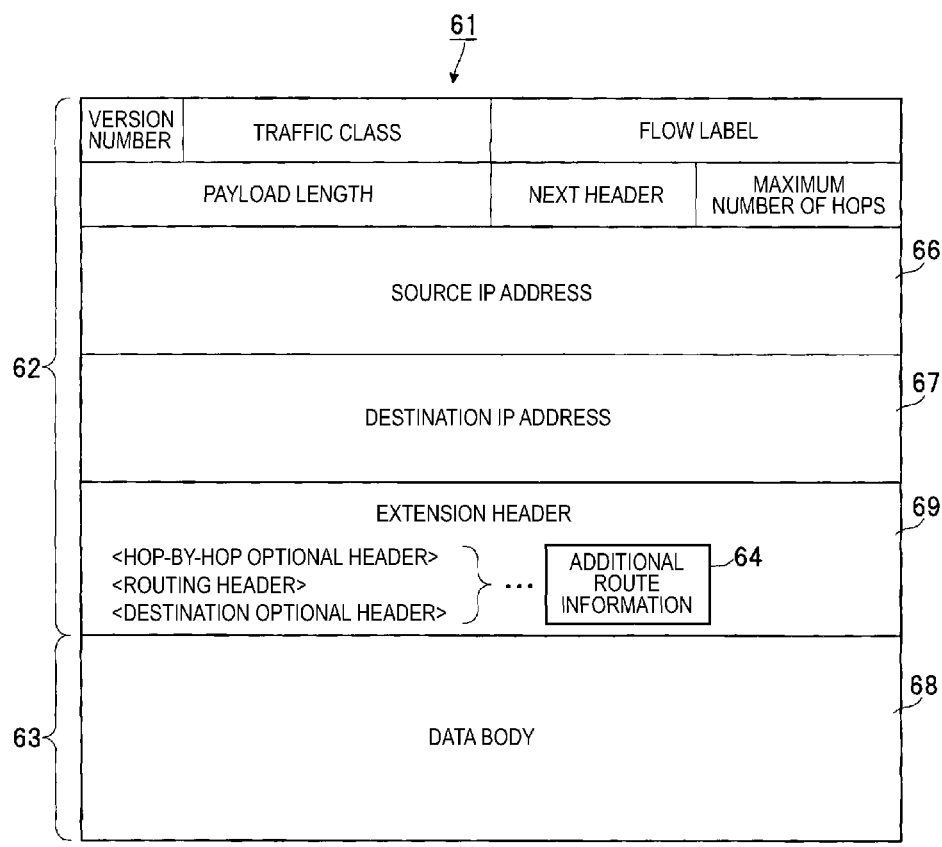
FIG. 4 is a diagram showing an example packet configuration applied to an IPv6 packet as a second example content packet of the embodiment.

FIG. 4 is a diagram showing an example packet configuration applied to an IPv6 packet as a second example content packet of the embodiment. An IP packet 61 of the second example conforms to IPv6, and a header 62 includes various pieces of information, such as a version number, a traffic class, a flow label, a payload length, a next header, and the maximum hop count. The header 62 also stores a source IP address 66 and a destination IP address 67, and additional route information 64 is stored in an extension header 69 of the header 62. Main body data 68 including content data are stored in a payload 63 of the IP packet 61. Such a packet format conforming to IPv6 is defined by RFC 2460, or the like. In relation to IPv6, an optional extension header is provided in place of the optional field for IPv4. The extension header 69 is configured so that various types of pieces of information, such as a hop-by-hop optional header, a routing header, and a destination optional header, can be added to the extension header 69. In the embodiment, the additional route information 64 is added by use of the extension header 69, and the packet route information is acquired by reference to the additional route information 64 stored in the extension header 69, whereby a specific content is identified. For instance, designated route information showing a predetermined route is previously stored in a routing header, thereby designating a packet route; route control information for controlling a route by indicating a packet transmission route is stored; or information about an actual transmission route over which a packet was actually transmitted is recorded. Thus, a reference can be made to information at an arbitrary or specific node. Alternatively, predetermined designated route information is stored in a hop-by-hop optional header or a destination optional header or actual transmission route information is recorded so that a reference can be made to the information at an arbitrary or specific node in the route. The packet transmission route information and the packet route control information are used in combination in connection with the additional route information 64, whereby an arbitrary route and a content can also be associated with each other.

[Another Example Configuration]

Figure 5:
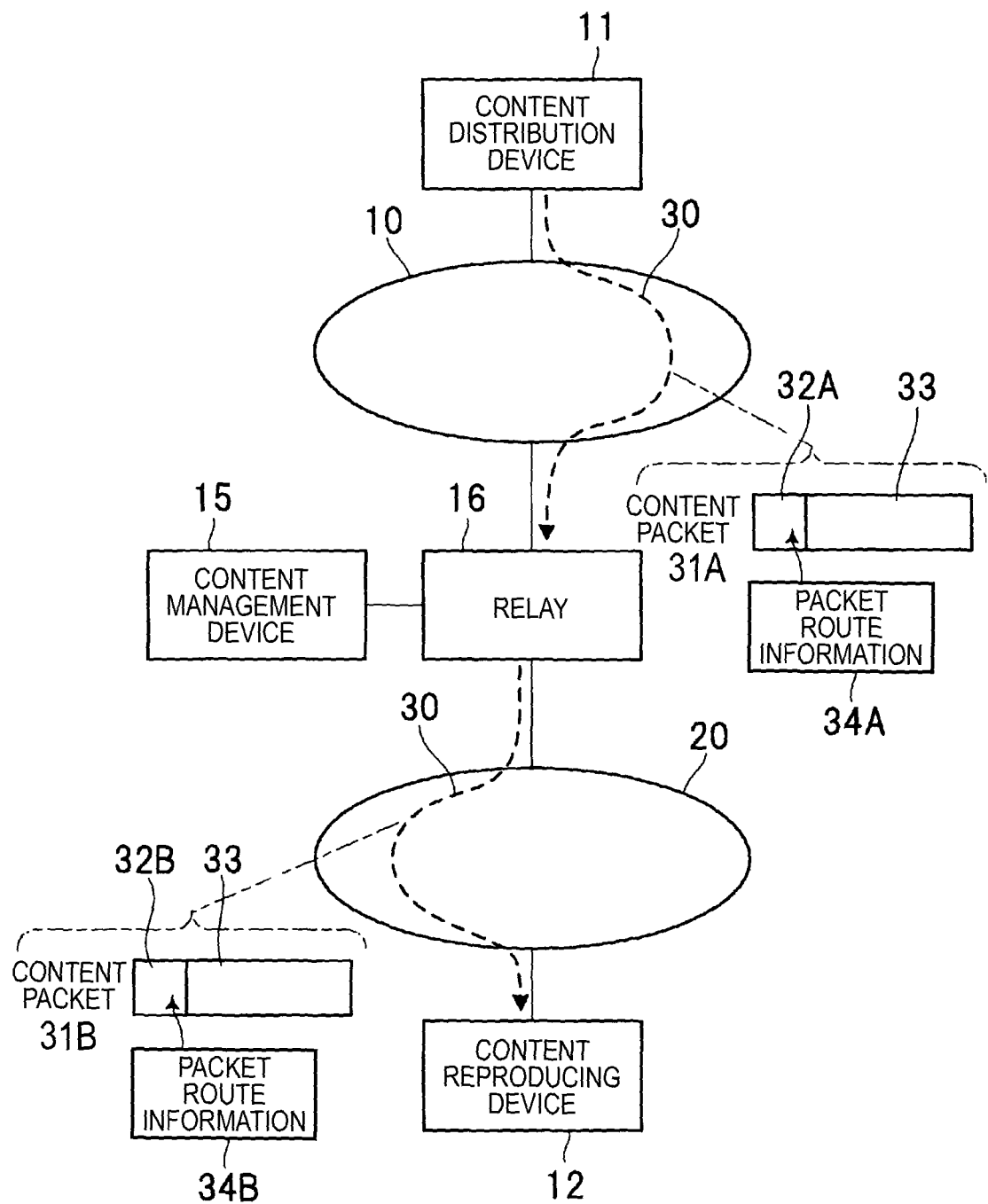
FIG. 5 is a configuration diagram showing a second example configuration of the content management device of the embodiment of the present invention.

FIG. 5 is a configuration diagram showing a second example configuration of the content management device of the embodiment of the present invention. The second example configuration shows an exemplary case where the content data 30 are transmitted by way of a relay 16 having capability of a content relay. The first network 10 and a second network 20 are connected together by way of the relay 16. The content data 30 distributed by the content distribution device 11 are transmitted to the content reproducing device 12 by way of the first network 10, the relay 16, and the second network 20. The content management device 15 is connected to the relay 16. Constituent elements that are analogous to those described in connection with the first example configuration are assigned the same reference numerals, and their repeated explanations are omitted. FIG. 5 shows the two networks 10 and 20 for explanation. However, the configuration can likewise be applied to a configuration where the relay 16 is provided in one network, a configuration in which the content data 30 are transmitted by way of three networks or more, and the like.

Having once relayed the content data 30 transmitted by the content distribution device 11, the relay 16 transmits the received content data 30 to the content reproducing device 12. When relaying the content data 30, the relay 16 performs processing for making a reference to packet route information about a content packet, adding address information about a relay point of the relay to packet route information, and others. A functional configuration and operation of the relay 16 are described in detail later. The relay 16 can also be configured with a gateway for making a connection to a network, a router, a firewall, an access management server, a relay server, or the like. Therefore, an implementer or a right holder of a content or an administrator who manages relaying of contents at relay points of respective depots in a network, like a communication business entity or a network provider that provides service for making a connection to a network or a communication line, a service provider that provides various content-related services, and others, can operate the relay 16. Further, the relay 16 may also be operated by the manager who is the same person that operates the content distribution device 11 and the content management device 15.

A yet-to-be-relayed content packet 31A that has been sent from the content distribution device 11 and transmitted to the first network 10 is assumed to include packet route information 34A in a header 32A. The relay 16 adds address information about itself to the packet route information, whereby packet route information 34B including the address information about the relay 16 (relay point information) is stored in a header 32B of a relayed content packet 31B. The content management device 15 identifies a content associated with a specific route according to the packet route information 34A in the header 32A of the content packet 31A to which the relay 16 has made a reference and the address information about the relay 16. Another available configuration is that the content management device 15 is provided in the second network 20 so that a content can be identified according to the packet route information 34B in the header 32B of the relayed content packet 31B transmitted over the second network 20. The content management device 15 can also be provided at a large number of locations in the network. Incidentally, some or all of the capabilities of the content management device 15 can also be provided in a content reproducing device, a content receiver, or the like, provided for the content user.

The relay 16 adds the packet route information 34 to the content packet 31 in the manner as mentioned above. The content management device 15 located at the location of the relay 16 or at a downstream position with respect to the relay 16 acquires the packet route information 34, to thus be able to identify a content.

Figure 6:
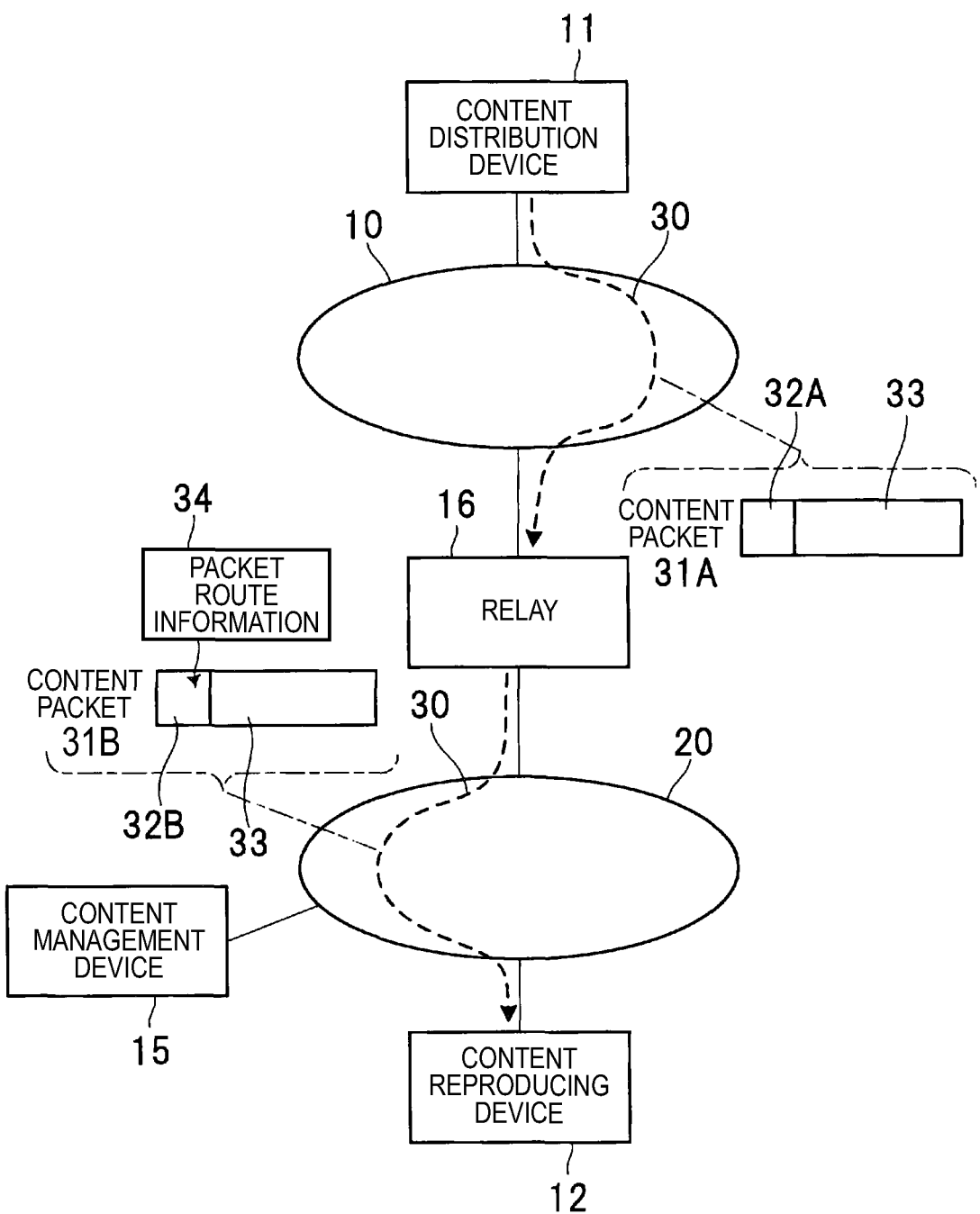
FIG. 6 is a configuration diagram showing a third example configuration of the content management device of the embodiment of the present invention.

FIG. 6 is a configuration diagram showing a third example configuration of the content management device of the embodiment of the present invention. The third example configuration shows an example in which packet route information is not preliminarily given at the time of distribution of a content. Like the second example configuration shown in FIG. 5, the first network 10 and the second network 20 are connected together by way of the relay 16. The content data 30 distributed by the content distribution device 11 are transmitted to the content reproducing device 12 by way of the first network 10, the relay 16, and the second network 20. The content management device 15 is provided in the second network 20. Constituent elements similar to those described in connection with the first and second example configurations are assigned the same reference numerals, and their repeated explanations are omitted. FIG. 6 shows the two networks 10 and 20 for explanation. The content management device can also be applied likewise even to a configuration in which the relay 16 is provided in one network, a configuration in which the content data 30 are transmitted by way of three networks or more, and the like. The content management device 15 may also be provided at a plurality of locations in the network. Some or all of the capabilities of the content management device 15 can also be imparted to a content reproducing device, a content receiver, or the like, disposed at a location of a content user.

The relay 16 relays the content data 30 transmitted from the content distribution device 11, thereby transmitting the content data to the content reproducing device 12. On relaying the content data 30, the relay 16 performs processing, like adding address information about a relay point of the relay 16 to packet route information.

The yet-to-be-relayed content packet 31A that has been sent from the content distribution device 11 and transmitted to the first network 10 is assumed not to include packet route information in the header 32A. The relay 16 adds address information about the relay 16 as packet route information to the packet route information, whereby the packet route information 34B including the address information about the relay 16 (relay point information) is stored in the header 32B of the relayed content packet 31B. The content management device 15 identifies a content associated with a specific route according to the packet route information 34B in the header 32B of the relayed content packet 31B that is to be transmitted through the second network 20.

Figure 7:
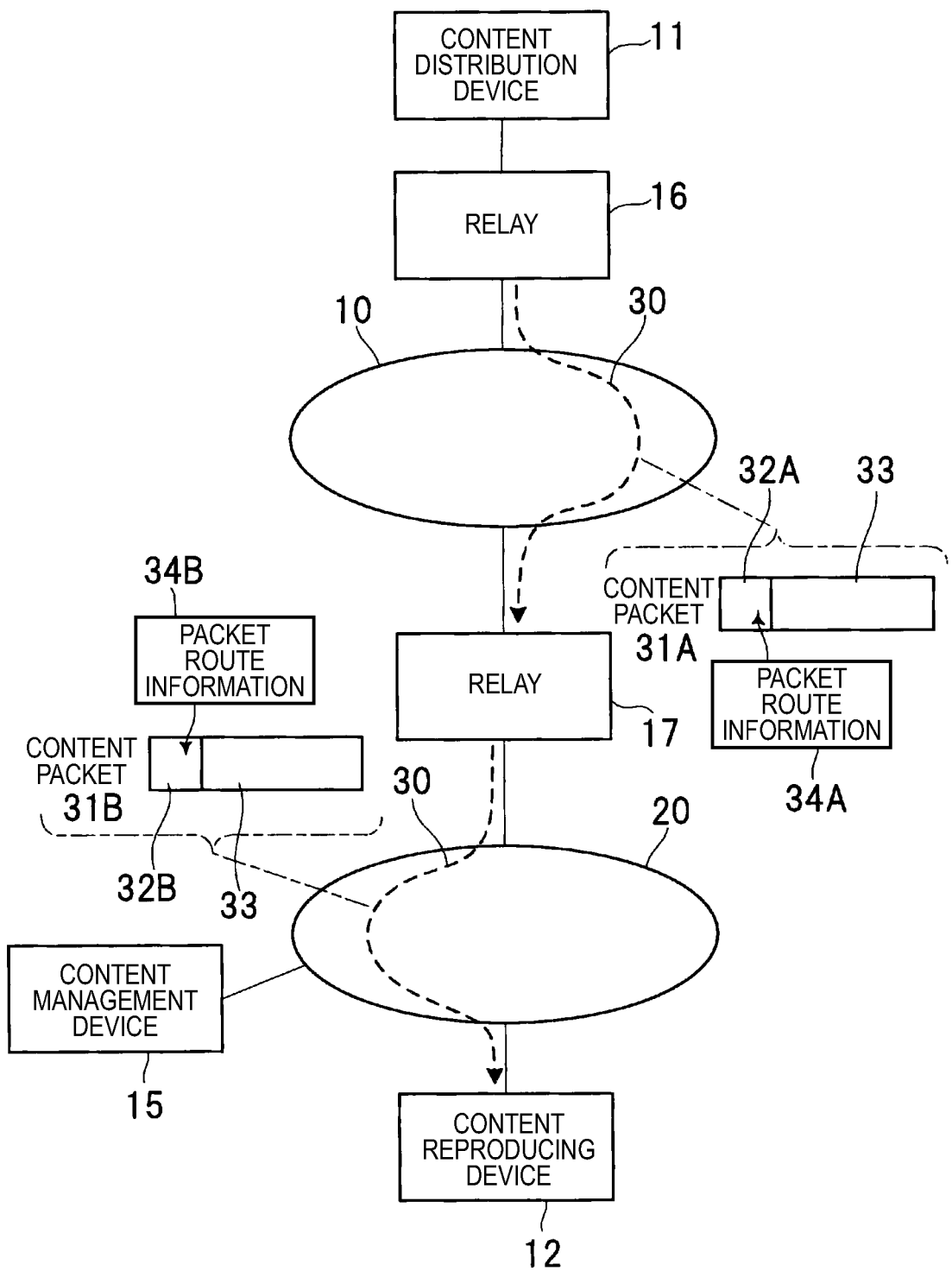
FIG. 7 is a configuration diagram showing a fourth example configuration of the content management device of the embodiment of the present invention.

FIG. 7 is a configuration diagram showing a fourth example configuration of the content management device of the embodiment of the present invention. The fourth example configuration shows an example in which the content management device is equipped with a plurality of relays. The content distribution device 11 is connected to the first network 10 by way of the relay 16. The first network 10 and the second network 20 are connected to each other by way of a relay 17. The content data 30 distributed by the content distribution device 11 are transmitted to the content reproducing device 12 by way of the relay 16, the first network 10, the relay 17, and the second network 20. The content management device 15 is provided in the second network 20. Constituent elements that are analogous to those described in connection with the first to third example configurations are assigned the same reference numerals, and their repeated explanations are omitted here for brevity. Although FIG. 7 shows the two networks 10 and 20 for illustration, the present invention can also be applied, in the same manner, to a configuration in which one network is provided with the plurality of relays 16 and 17, a configuration in which three or more relays are provided, a configuration in which the contents data 30 are transmitted by way of three or more networks, and the like. The content management device 15 can also be provided in large numbers in the network. Moreover, some or all of the capabilities of the content management device 15 can also be imparted to a content reproducing device, a content receiver, or the like, disposed for a content user.

The relays 16 and 17 are for relaying the content data 30 transmitted from the content distribution device 11, to transmit the content data toward the content reproducing device 12. On relaying the content data 30, the relays 16 and 17 perform processing for adding address information about the relay points of the relays 16 and 17 to the packet route information, and the like. The fourth example configuration can be applied to any of cases including a case where packet route information is previously imparted at the time of distribution of a content and a case where the packet route information is not previously provided.

The relay 16 adds address information about itself to the packet route information in the content data 30 transmitted from the content distribution device 11, whereby the packet route information 34A including address information about the relay 16 (first relay point information) is stored in the header 32A of the content packet 31A that is to be transmitted through the first network 10 after having been relayed. The relay 17 adds its address information to the packet route information, whereby the packet route information 34B further including address information about the relay 17 (second relay point information) is stored in the header 32B of the content packet 31B that is transmitted to the second network 20 after having been relayed. According to the packet route information 34B in the header 32B of the content packet 31B transmitted over the second network 20, the content management device 15 identifies a content associated with a specific route.

As mentioned above, the plurality of relays 16 and 17 add the packet route information 34 to the content packet 31. The content management device 15 located at the position of the relay 17 or a downstream position with respect to the relay 17 acquires the packet route information 34, whereby the content can be identified. Moreover, as a result of the plurality of relays being disposed, the accuracy of determination of the packet route information can be improved, so that content data can be managed more precisely.

Figure 8:
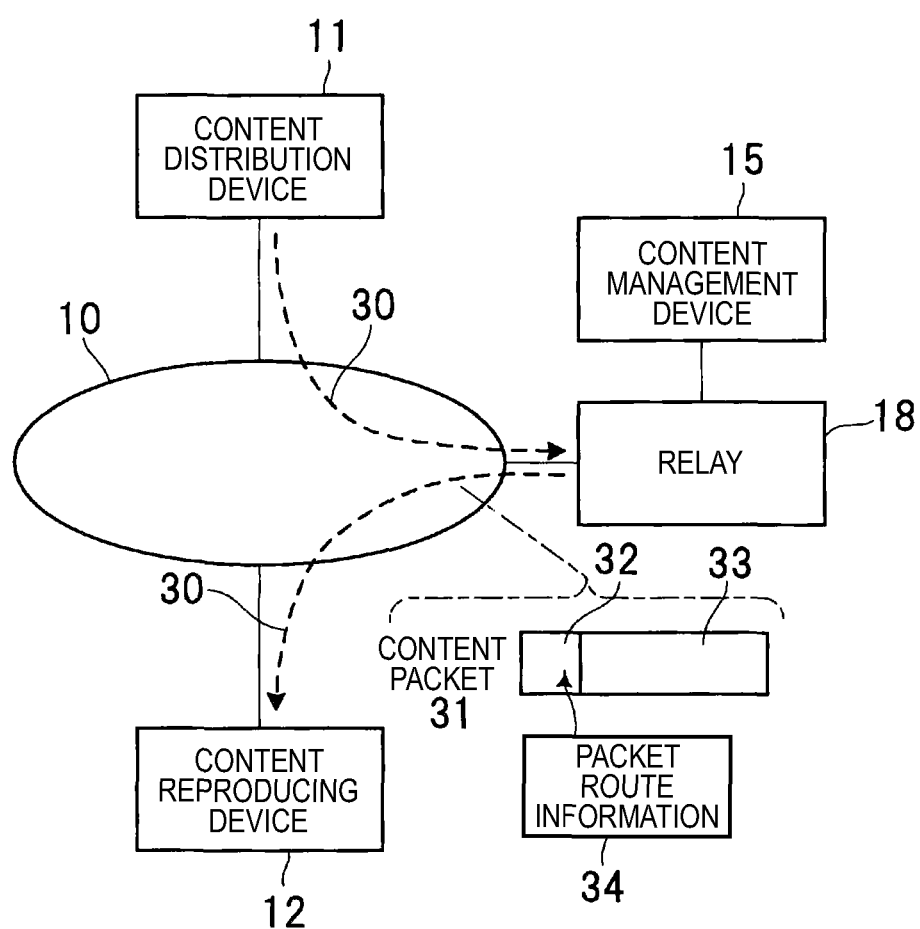
FIG. 8 is a configuration diagram showing a fifth example configuration of the content management device of the embodiment of the present invention.

FIG. 8 is a configuration diagram showing a fifth example configuration of the content management device of the embodiment of the present invention. The fifth example configuration shows an example in which a peer-to-peer connection is established between the content distribution device 11 and the content reproducing device 12. In this case, the content distribution device 11 assumes a configuration in which the content distribution device is composed of various pieces of electronic equipment having communication capabilities equivalent to that of the content reproducing device 12. The content data 30 are assumed to be transmitted by way of a relay 18. The content distribution device 11, the relay 18, and the content reproducing device 12 are connected to the network 10, and the content management device 15 is connected to the relay 18. The content distribution device 11 and the content reproducing device 12 are in a peer-to-peer connection by way of the network 10, so that a communication can be established therebetween. The content data 30 distributed by the content distribution device 11 are transmitted to the content reproducing device 12 having once been relayed by the relay 18. Constituent elements that are analogous to those described in connection with the first example configuration are assigned the same reference numerals, and their repeated explanations are omitted. FIG. 8 shows one network 10 for explanation. However, the configuration can likewise be applied to a configuration in which the content data 30 are transmitted by way of a plurality of networks. The content management device 15 can also be provided at a large number of locations in the network 10. Moreover, some or all of the capabilities of the content management device 15 can also be imparted to a content reproducing device, a content receiver, or the like, disposed for a content user.

Having once relayed the content data 30 transmitted by the content distribution device 11, the relay 18 transmits the received content data 30 to the content reproducing device 12. When relaying the content data 30, the relay 18 performs processing for making a reference to packet route information about a content packet, adding address information about a relay point of the relay to the packet route information, and others. The relay can also be disposed in large numbers. Moreover, the relay 18 does not necessarily add address information about a relay point of the relay 18 to the packet route information. The relay 18 can also be configured of a connection management server or a relay server for a peer-to-peer connection, a gateway, or the like. Therefore, an implementer or a right holder of a content or a manager who manages relaying of contents at relay points of respective depots in a network, like a communication business entity or a network provider that provides service for making a connection to a network or a communication line, a service provider that provides various content-related services, and others, can operate the relay 18. The manager that is the same person as who manages the content distribution device 11 and the content management device 15 can operate the relay 18.

The relay 18 relays the content packet 31 transmitted from the content distribution device 11 and delivered to the first network 10, and the relay 18 adds address information about itself to the packet route information in the header. The packet route information 34 including the address information about the relay 18 (relay point information) is stored in the header 32 of the content packet 31 that has been relayed. According to the packet route information 34 in the header 32 of the content packet 31 to which the relay 18 has made a reference and the address information about the relay 18, the content management device 15 identifies a content associated with a specific route. In another possible configuration, the content management device 15 is placed in the network 10, and a content is identified according to the packet route information 34 in the header 32 of the content packet 31 that is transmitted over the network 10 after having been relayed.

Even when communication is carried out by means of a peer-to-peer connection as mentioned above, the content is transmitted by way of the relay 18, whereby the content management device 15 can acquire the packet route information 34 and identify the content.

In each of example configurations, the content management device captures the content packet and identifies the content associated with the route by use of the packet route information about the content packet, whereby a transmission status of the specific content can be detected and grasped. Communication traffic corresponding to each content, like a transmission volume of content packet, is detected and accumulated, whereby a usage situation of the specific content can be grasped.

[Example Correlation Between a Content and Packet Route Information]

By reference to a specific example, explanations are now given to a correlation between a content and a packet route and identifying a content by usage of packet route information.

Figure 9:
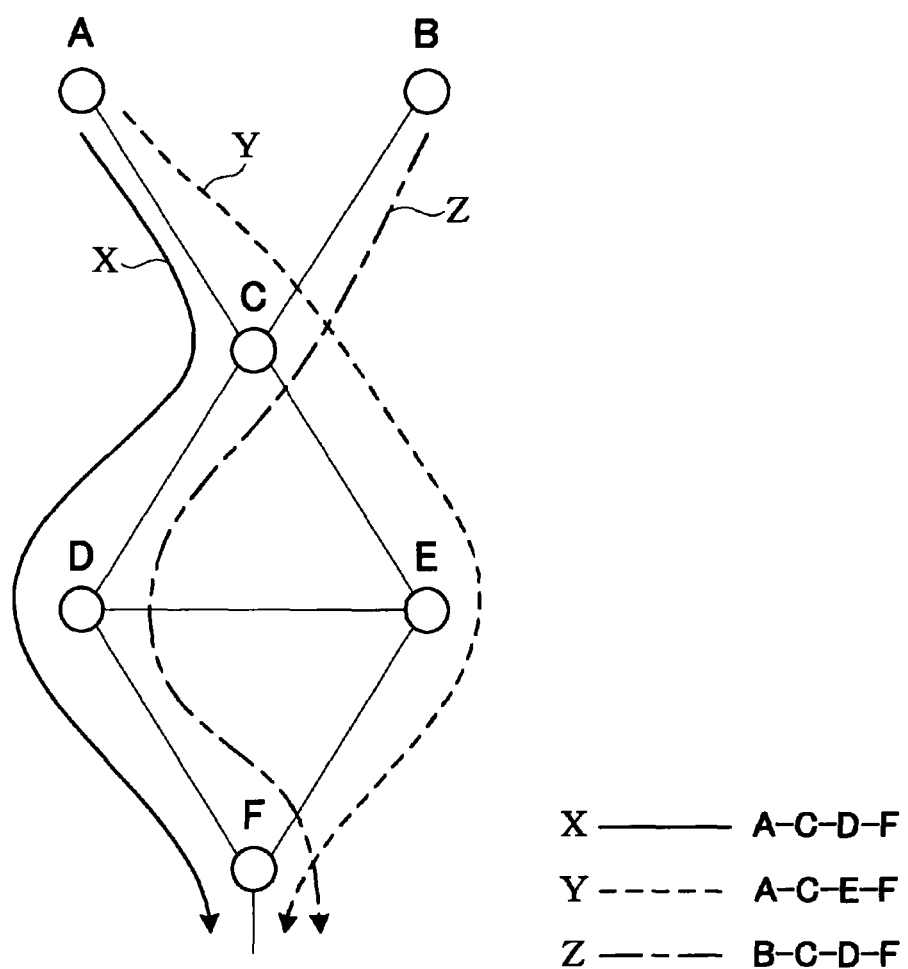
FIG. 9 is a diagram showing a first example correlation between a content and a packet route of the embodiment of the present invention.

FIG. 9 is a diagram showing a first example correlation between a content and a packet route of the embodiment of the present invention. In FIG. 9, content packets including respective content data; namely, a content X, a content Y, and a content Z are here assumed to be transmitted over different routes, and FIG. 9 also shows that the respective contents are associated with the respective routes. In this case, relay points A, B, C, D, E, and F that are composed of a router, a relay, or the like, are assumed to be disposed in the network, and connections, such as those shown in the drawing, are also assumed to be provided. The illustrated example shows a conceptual configuration for the sake of simplification of an explanation. The correlation between the contents and the pieces of corresponding packet route information is set in such a way that the packet of the content X is transmitted along a route A-C-D-F; the packet of the content Y is transmitted along a route A-C-E-F; and the packet of the content Z is transmitted along a route B-C-D-F.

A content packet that transfers each content can pass through a different predetermined route under route control on a per-content-basis. For instance, all you have to do is to classify, as required, content packets according to a content right holder, a content implementer, a content distributor, and the like, thereby determining address information, like a transmission source, relay points in a predetermined section, and the like. A conceivable example method for linking a content to packet route information is to set the correlation between contents and packet route information by means of setting content identification information through use of information including a predetermined number of bits and associating each of the bits of the identification information with address information about respective relay points, or the like.

In the first example shown in FIG. 9, when the route A-C-D-F is included in the content packet as packet route information, the packet can be identified as a content packet of the content X. Moreover, when the route A-C-E-F is included in the content packet as packet route information, the packet can be identified as a content packet of the content Y. Furthermore, when the route B-C-D-F is included in the content packet as packet route information, the packet can be identified as a content packet of the content Z. Alternatively, packet route information can also be set according to classification of contents. For instance, when A is included as a source or a relay point in the packet route information, packet route information is set according to classification of contents while a content relates to a right holder M. Further, when B is included as a source or a relay point in the packet route information, packet route information is set according to classification of contents while a content relates to a right holder N. As mentioned above, a plurality of contents can be identified by a combination of pieces of address information in the packet route information.

Figure 10:
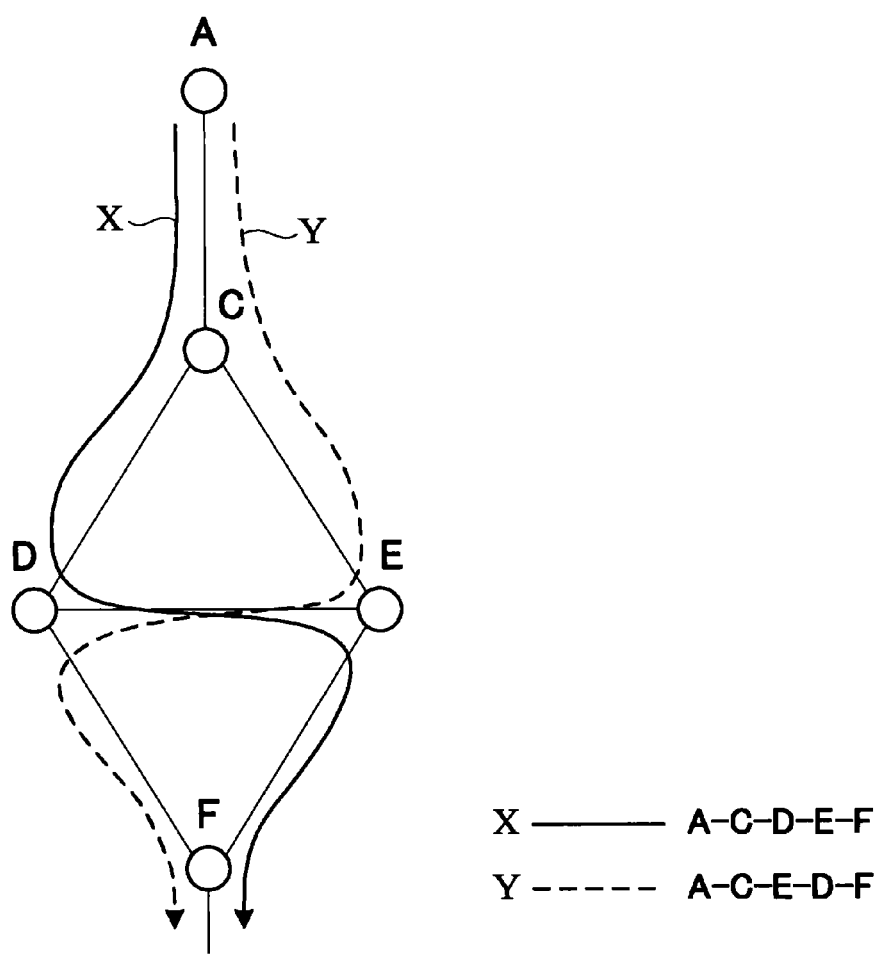
FIG. 10 is a diagram showing a second example correlation between the content and a packet route of the embodiment of the present invention.

FIG. 10 is a diagram showing a second example correlation between a content and a packet route of the embodiment of the present invention. The second example shown in FIG. 10 is a modification of the first example shown in FIG. 9 including different sequences of the relay points laid along the respective routes. FIG. 10 shows example correlations between two contents X and Y and their respective corresponding routes. A correlation between a content and its packet route information is set in such a way that the packet of the content X is transmitted over a route A-C-D-E-F and that the packet of the content Y is transmitted over a route A-C-E-D-F.

In the second example shown in FIG. 10, when A-C-D-E-F is included as packet route information, the packet can be identified as being a content packet for the content X. Moreover, when A-C-E-D-F is included as packet route information, the packet can be identified as being a content packet for the content Y. Thus, a plurality of contents can be distinguished from each other by means of sequences included in the pieces of address information as well as the address information in the packet route information.

[Usage Pattern of Packet Route Information]

Several example usage patterns of packet route information in the content management device of the present embodiment are now itemized. Examples achieved when the content management device is applied to an IP network are herein provided.

(1) A Usage Pattern Achieved when Only the Source Information is Used as Packet Route Information For instance, when not so many or a large number of types of contents are objects of management, a usage pattern using only source information as packet route information is available. In the case of an IP packet, the essential requirement is to set a plurality of pieces of packet route information by means of types of combinations of source IP addresses with ports and to set content-route correspondence information by means of associating the respective contents with the respective pieces of packet route information. In this case, the content distribution device 11 transmits a content packet from a source IP address and a port corresponding to a content to be distributed. The content management device 15 acquires, as packet route information, the source IP address and the port of the content packet and identifies a specific content corresponding to the specific source IP address and the port according to the content-route correspondence information. Additional route information including source address information may also be used in lieu of the packet source information. As mentioned above, the content packet originating from the specific source can be identified as a specific content by use of the source address information. In this case, the content can be associated with the route by means of only the content distribution device disposed in the source, and there is no particular necessity for taking into account information about relays and relay points. Therefore, regardless of a route of relay points employed along its way to a destination, a content can be identified by use of packet route information.

(2) A Usage Pattern Achieved when Only Additional Route Information is Used as Packet Route Information In contrast with (1), there is employed a usage pattern using only additional route information as packet route information, and a content can also be identified by means of address information about a specific relay point without regard to a source. In this usage pattern, only address information about a relay point is assumed as additional route information. In the case of an IP packet, the essential requirement is to set a plurality of pieces of packet route information by means of one combination of an IP address of a relay point with a port or a sequence of the IP address and the port, or a plurality of combinations of IP addresses of a plurality of relay points with ports or sequences of the IP addresses and the ports and to set content-route correspondence information by means of associating the respective contents with the plurality of pieces of packet route information. In this case, the content distribution device 11 and the relay 16 perform route control in such a way that a content packet of interest passes through a specific route corresponding to the content. Route control can also be performed by means of designated route information or route control information included in a content packet or route control information belonging to the relay 16. Alternatively, route control can also be performed by means of separately transmitting a control signal, route control information, or the like, from the content distribution device to the relay 16 or from the relay 16 to the other relay 17. The content management device 15 acquires address information about relay points for a content packet stored in additional route information and identifies a specific content corresponding to a specific relay point according to the content-route correspondence information. As mentioned above, the content packet passed through a specific relay point can be identified as a specific content by use of address information about the relay point. Depending on a network configuration, a communication protocol, a route control method, a content type, and the like, when a plurality of routes for one content are conceived, the essential requirement is to use content-route correspondence information that associates the plurality of routes with a single content.

(3) Usage Pattern Using Source Information and Additional Route Information as Packet Route Information A usage pattern that uses source information and additional route information as packet route information by combinations of (1) with (2) is also available. In this case, a wider variety of settings of content-route correspondence information can be made. Address information about a source and relay points can also be used while being included in additional route information in place of the packet source information. In this case, the content distribution device 11 transmits a content packet from the source IP address and the port corresponding to the content to be distributed. The content distribution device 11 and the relay 16 perform route control in such a way that the content packet passes through a specific route corresponding to the content. The content management device 15 acquires address information about a source and relay points of the content packet by reference to the source information and the additional route information and identifies a specific content corresponding to the specific source and the relay points according to the content-route correspondence information. As mentioned above, the content packet that has been transmitted form the specific source and passed through the specific relay points can be identified as the specific content by use of the address information about the source and the relay points. In this case, a plurality of types of content-route correspondence information are available. The reliability of a content identification result can be enhanced as the number of pieces of address information about relay points for identification is increased. When a plurality of routes are supposed for one content according to a network configuration, a communication protocol, a route control method, and a content type, the essential requirement is to use content-route correspondence information that associates the plurality of routes with the single content.

As a modification, there can also be adopted a pattern in which a content packet is transmitted from a specific source IP address and a port corresponding to a content to be distributed by the content distribution device 11 and in which the content packet is caused to pass in such a way that a relay under control of the content distribution device 11 causes the content packet to pass through specific relay points. For instance, the pattern can be implemented by an intranet including the content distribution device 11. In this case, a distribution side can set and impart address information about a source and relay points in an initial phase to a content packet as packet route information about the content packet. Therefore, the content distribution device 11 can impart packet route information including the source and the relay points to the content packet, thereby associating the content with a route. For this reason, the content can be identified by use of the packet route information without involvement of a particular necessity for address information about relay points that will lie ahead and without regard to a route of relay points placed on its way to a destination. Using such a configuration makes it possible to grasp, manage, or the like, a usage situation of a content within; for instance, an organization of the content distribution side.

[Example Configuration and Operation of the Respective Devices]

Functional configurations and operation of the content distribution device, the relay, and the content management device used in the present embodiment are now exemplified. An example based on the assumption that the devices are applied to an IP network conforming to IPv6 is hereunder described.

Figure 11:
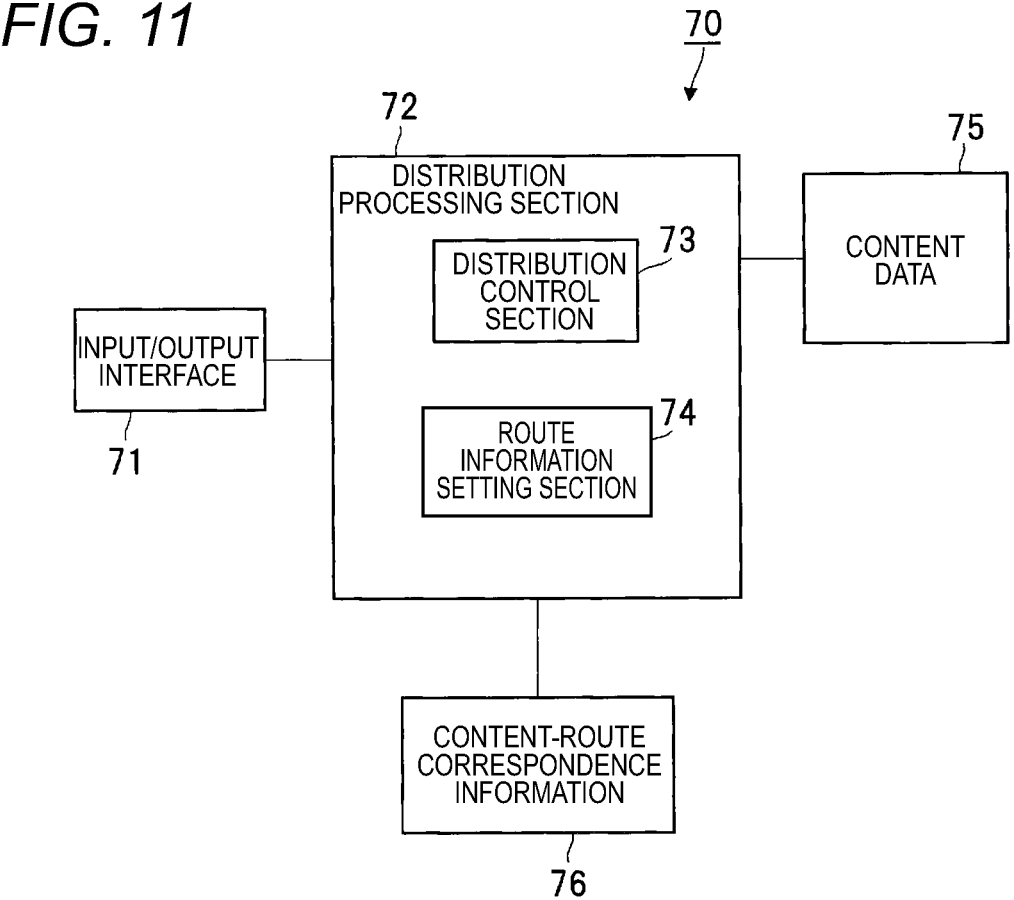
FIG. 11 is a section diagram showing a functional configuration of a content distribution device of the embodiment of the present invention.

FIG. 11 is a section diagram showing a functional configuration of a content distribution device of the embodiment of the present invention. A content distribution device 70 is composed of an input/output interface 71 and a distribution processing section 72. The input/output interface 71 is an interface that connects the content distribution device 70 to a network or a relay and that inputs and outputs data to and from the content distribution device 70. The input/output interface 71 may be a network interface conforming to IEEE 802.3 standards. The distribution processing section 72 is for implementing respective capabilities pertaining to content distribution by means of executing a predetermined program in a computer having a processor, memory, and others. The distribution processing section 72 has a distribution control section 72 and a route information setting section 74.

The distribution control section 73 is for performing control operation in order to read target content data 75 and distribute the read content data to a content reproducing device, or the like, at a destination. The distribution control section 73 sends an IP packet that is a content packet including the content data 75 to a predetermined destination. The input/output interface 71 acts as an output section and outputs an IP packet including a content packet. According to preset content-route correspondence information 76, the route information setting section 74 sets packet route information as information for defining a specific route corresponding to the content. A source IP address in a header of the IP packet can be utilized as one of the pieces of packet route information. Further, when additional route information, such as designated route information showing relay points in a packet transmission route and route control information for controlling a packet transmission route, is set as packet route information, additional route information is stored in an extension header of the header of the IP packet. Although described in detail later, the content-route correspondence information 76 includes content route information set in correspondence with a specific content and ID information for identifying a content and associates the pieces of information with each other. Alternatively, the content distribution device 70 does not set additional route information, like designated route information, route control information, and the like, and instead the relay may impart designated route information and route control information.

For instance, contents and their corresponding routes are previously associated with each other in such a way that a first content (a content A1 of a right holder A) is distributed by way of a first relay point and that a second content (a content B2 of a right holder B) is distributed by way of a second relay point. Content packets including the respective contents can thereby be distinguished from each other by reference to the packet route information. Further, a plurality of pieces of address information are combined together as packet route information, whereby a plurality of contents can be distinguished from each other. Moreover, the packet route information is not limited to a combination of pieces of address information. It is also possible to make the packet route information include a sequence of pieces of address information about relay points through which the packet has passed and to identify a content by means of specific address information and the sequence of pieces of address information. The content data 75 and the content-route correspondence information 76 may be stored in memory or a storage provided in the content distribution device 70, another storage or server, or a combination thereof.

Figure 12:
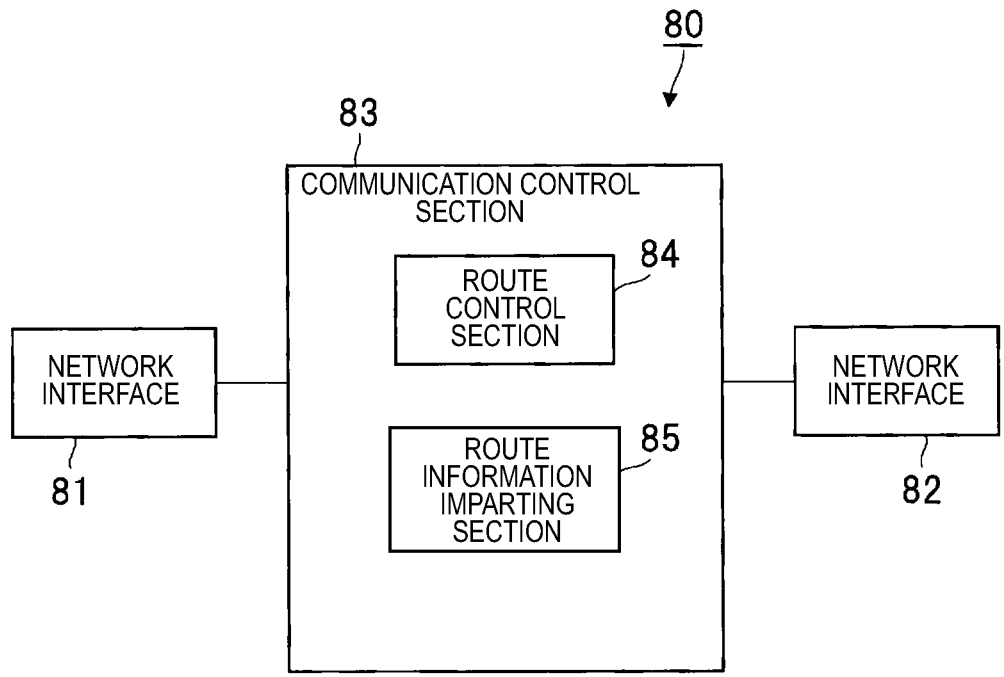
FIG. 12 is a section diagram showing a functional configuration of a relay of the embodiment of the present invention.

FIG. 12 is a section diagram showing a functional configuration of a relay of the embodiment of the present invention. A relay 80 is composed of network interfaces 81 and 82 and a communication control section 83. The network interfaces 81 and 82 are interfaces that connect the relay 80 to a network and that input and output data to and from a first layer (a physical layer) and a second layer (a data link layer) of an OSI reference model complying with IEEE 802.3 standards. The communication control section 83 implements respective capabilities pertaining to communication control by means of executing a predetermined program in a computer having processor, memory, and the like, and includes a route control section 84 and a route information adding section 85.

By reference to a header of a received IP packet including a content packet, the route control section 84 sends an IP packet to a destination on a predetermined route according to route control information previously set in the relay 80 and packet route information such as additional route information about a destination IP address, a port, and an extension header of an IP packet (route control information, designated route information showing relay points, and others). The route control section 84 can also perform route control by means of at least one of route control information provided in the relay and packet route information in the header of the IP packet. The network interfaces 81 and 82 act as input/output sections and input and output an IP packet including a content packet.

The route information adding section 85 imparts, as packet route information, additional route information equivalent to actual transmission route information including address information about relay points of the relay 80 (an IP address, a port, and the like) to the extension header of the header in the IP packet. Alternatively, the relay 80 can also be arranged so as to impart additional route information, such as route control information, designated route information, and the like. The relay 80 is herein described as one that has at least any one of the route control capability and the route information adding capability. However, a relay having a common router capability that transfers a packet to the next node by reference to a destination IP address can also be placed in the network.

Figure 13:
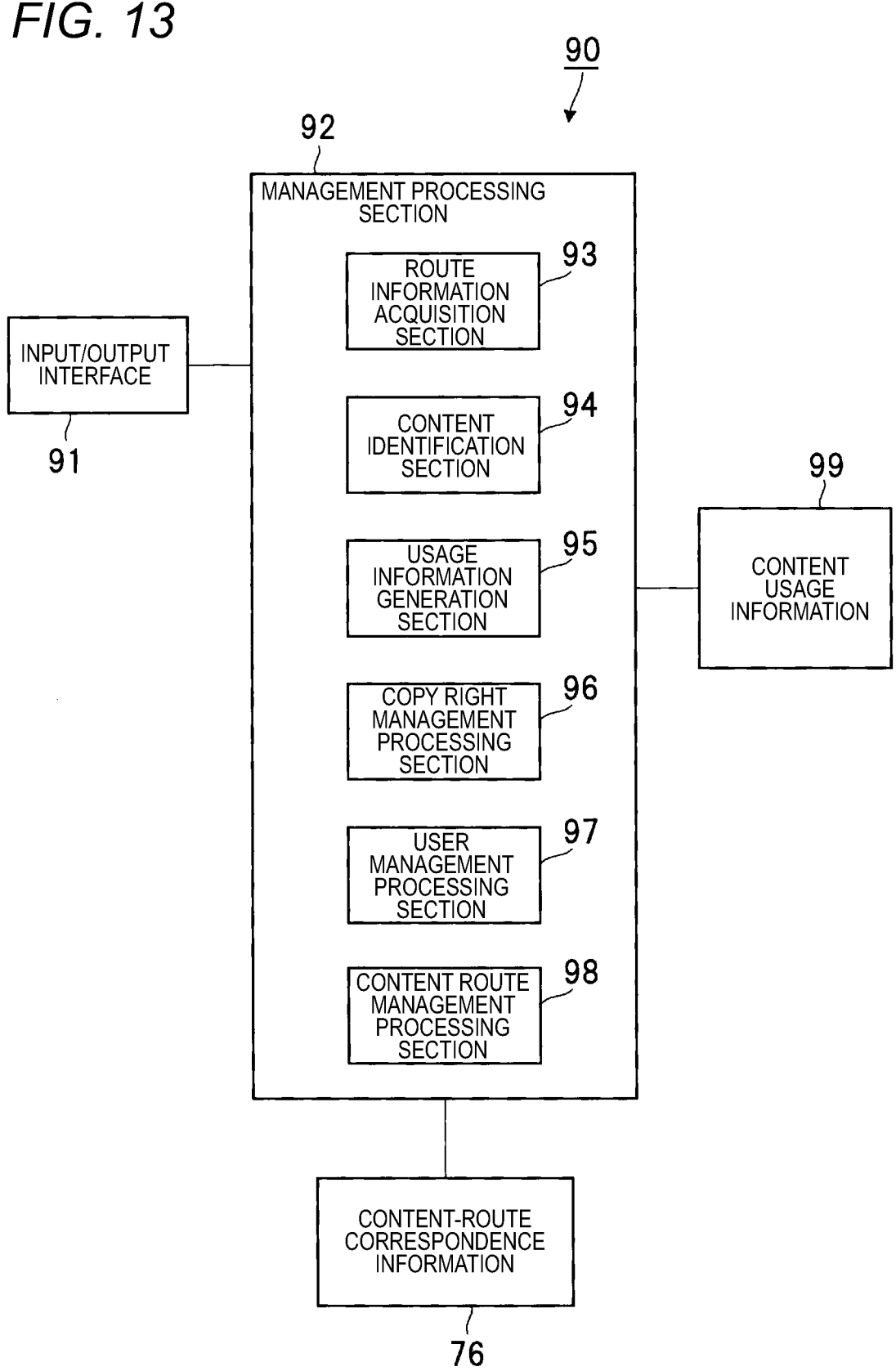
FIG. 13 is a section diagram showing the functional configuration of the content management device of the embodiment of the present invention.

FIG. 13 is a section diagram showing the functional configuration of the content management device of the embodiment of the present invention. A content management device 90 is composed of an input/output interface 91 and a management processing section 92. The input/output interface 91 is an interface that connects the content management device 90 to the relay 80 or the network and that inputs and outputs data to and from the content management device 90. The input/output interface 91 may also be a network interface complying with IEEE 802.3 standards. The management processing section 92 is for implementing respective capabilities pertaining to content management by means of executing a predetermined program in a computer having a processor, memory, and others. The management processing section 92 has a route information acquisition section 93, a content identification section 94, a usage information generation section 95, a copy right management processing section 96, a user management processing section 97, and a content route management processing section 98.

The route information acquisition section 93 acquires packet route information about a target IP packet by reference to packet route information in a header of an IP packet, like packet route information set by the content distribution device 70 and packet route information referred to or imparted by the relay 80. Alternatively, the route information acquisition section 93 acquires packet route information about a target IP packet by reference to the header of the IP packet, such as a packet including a content transmitted to the network from the content management device 90. The content identification section 94 identifies a specific content corresponding to packet route information according to the acquired packet route information and the previously-set content-route correspondence information 76. The content-route correspondence information 76 may be stored in memory or a storage provided in the content management device 90, another storage or server, or a combination thereof.

FIG. 14 is a table showing example content-route correspondence information. Content-route correspondence information has content route information 111 set in correspondence with a specific content and a content ID 112 that is ID information for identifying a content and is composed of information, like a table that associates the content route information with the ID information. Moreover, the content-route correspondence information can also be formed so as to include, as information about contents, content-related information 113 and a content data size 114. Information having an IP address, like "1234:5678::1234:0:0:9abc," and a port number, like "49152," can be used as the content route information 111. ID information, like "AB0001," is set so as to be assigned as a content ID corresponding to address information including one or a plurality of IP addresses and a port. When a plurality of routes are assumed to exist for one content because of a network configuration, the essential requirement is to set content-route correspondence information including the correlation between respective pieces of content route information for the plurality of routes and the single content. The content-related information 113 includes content implementers, titles, copy right information, and the like. The copy right information includes, as information about copy rights of respective contents, specifics of a copy right, a right holder, and a usage charge, and the like. The content data size 114 is information about a data size of each content and stores the data size in kilobytes.

According to the content-route correspondence information 76, such as that mentioned above, the content identification section 94 determines whether the packet route information acquired by the route information acquisition section 93 includes specific address information and extracts a content ID corresponding to the packet route information. For instance, in relation to an illustrated example, when "1234: 5678::1234:0:09abc,49152" and "5678:9abc::1234:0:0: 0001,49152" are included, as a pair consisting of an IP address and a port, in the packet route information about an IP packet, the IP packet can be identified as being a content packet including content data having content ID "AB0001." Therefore, a specific corresponding content can be determined to be transmitted by means of identification of a packet for a specific route.

In order to make it easy to distinguish the specific packet from other common packets during identification of packet route information, there are various conceivable setting examples, like using, for instance, any of 49152 to 65535 that are dynamic/private ports (DYNAMIC AND/OR PRIVATE PORTS) as a port number or defining a specific port number as a port number. It is also possible to apply a computer virtualization technique to the content distribution device, the relays, the content management device, and the like, thereby virtually implementing a plurality of network interfaces, computers, and others. So long as an IP address and a port are assigned to each of the virtualized network interfaces, or the like, a necessity for setting hardware for each of the devices will be eliminated, so that a plurality of sources, and relay points can be readily disposed and set. Flexible setting of the packet route information thereby becomes possible.

In the management processing section 92 of the content management device 90, the usage information generation section 95 generates usage information including information showing a volume of identified content used, a usage time, and the like, for each content according to an identification result yielded by the content identification section 94; and stores the generated usage information as content usage information 99. The content usage information 99 can be stored in memory or a storage provided in the content management device 90, another storage or server, or a combination thereof.

FIG. 15 is a table showing example content usage information. the content usage information is formed, in correspondence with a content ID 121, from content index information 122, a usage volume 123, time information 124, copy right information 125, and the like. The content index information 122 is information about respective contents and includes information corresponding to a content ID, like a content implementer, a title, and others. The usage volume 123 is information showing a volume of usage of each content, such as the number of times each content is distributed, the volume of information of each content, the number of times a content is used, and a usage time of a content. An example shown in FIG. 15 represents the number of a content utilized (the number of times a content is utilized). The usage volume 123 can be determined from a relationship between a data size of a content and a packet size of the same. For instance, when the number of times a content is utilized is determined, it is calculated by multiplying the number of transmitted content packets by a packet size and dividing a result of multiplication (a volume of a transmitted packet) by the content data size 114 of the content. Alternatively, the volume of a packet transmitted in correspondence with each content can be used as the usage volume 123. The time information 124 is information pertaining to a time during which each content is distributed; for instance, a time of each transmission (a start time, an end time, and the like), a time consumed for transmission, a final transmission time, and a cumulative time. By means of content usage information, such as the usage volume 123 and the time information 124, the usage situation of a content can be grasped. The copy right information 125 is information pertaining to a copy right of each content and used for copy right management performed by the copy right management processing section 96. Specifics of a copy right, a right holder, a usage charge, and the like, are used as the copy right information 125.

In the management processing section 92 of the content management device 90, the copy right management processing section 96 performs processing pertaining to copy right management of an identified content according to a result of identification performed by the content identification section 94. For instance, the copy right management processing section 96 performs copy right management processing for each content by reference to the content usage information 99. In relation to copy right management processing, there is performed processing for generating information showing a usage volume pertaining to a volume of a utilized content corresponding to a specific copy right, processing for calculating a usage charge corresponding to a royalty commensurate with a usage volume, and the like, by use of information; for instance, the usage volume 123 of a content. By use of the content usage information 99, the copy right management processing section 96 can also perform copy right management processing based on a protocol or program belonging to a high-level hierarchical layer of the network. In this case, processing pertaining to authentication of an authorized user, a restriction on usage of a content, and the like, is performed.

In the management processing section 92 of the content management device 90, the user management processing section 97 performs processing pertaining to management of the user for an identified content, on the basis of a result of identification performed by the content identification section 94. User-route correspondence information including the correlation between packet route information and user ID information, for instance, is previously stored in connection with user management processing, whereby a user corresponding to packet route information is identified. Thereby, the content reproducing device can perform user identification, control of content distribution for each user, and the like. Like the content usage information, it is also possible to perform on a per-user basis processing, like acquisition of a volume of a utilized content, calculation of a usage charge of a content, and the like.

In the management processing section 92 of the content management device 90, the content route management processing section 98 performs distribution control processing according to packet route information. On this occasion, ID information about a content body serving as content management information and content route information set in correspondence with a specific content are provided so as to be included in the content-route correspondence information 76. The content route management processing section 98 makes a reference, as a pair, to both ID information about a content body identified by reading content data in a payload of a content packet and packet route information in the header of the content packet. The content route management processing section 98 determines validity of a content by means of a match between content route information corresponding to ID information about the content body with packet route information about the content packet. The content packet having packet route information that is different from predetermined content route information is determined not to be a content passed through a valid route. When a mismatch exists between the packet route information about the identified content and content route information corresponding to ID information about the content body, a relay, or the like, performs processing for limiting transmission of the target content. As mentioned above, distribution control processing based on the packet route information is performed, whereby management processing, like limitation of content usage, becomes possible. As mentioned in connection with the example of the content route management processing section 98, it is also possible to manage a content by combination of content management processing using route information described in connection with the present embodiment, content identification based on a protocol or program belonging to a high hierarchical layer using content management information, and content management processing such as copy right management.

Explanations are now given to procedures of various types of processing pertaining to content management performed by the content management device 90 of the embodiment.

Figure 16:
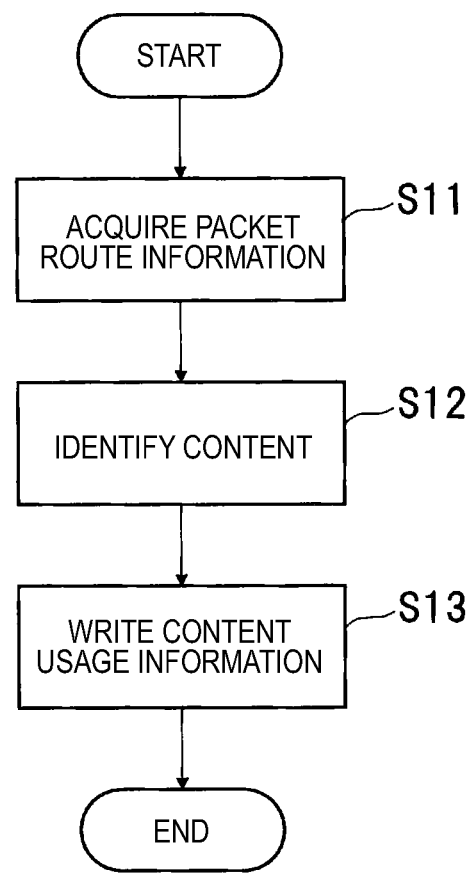
FIG. 16 is a flowchart showing procedures of the content management device of the embodiment for identifying a content and generating usage information.

FIG. 16 is a flowchart showing procedures of the content management device of the embodiment for identifying a content and generating usage information. In the management processing section 92 of the content management device 90, the route information acquisition section 93 makes a reference to packet route information about the header of a target IP packet, to thus acquire packet route information about the IP packet (step S11). The content identification section 94 identifies whether or not there is a specific content corresponding to the packet route information, according to the acquired packet route information and the content-route correspondence information 76 (step S12). The usage information generation section 95 generates usage information pertaining to a corresponding content and writes the generated usage information as the content usage information 99 into the content management device 90 or a storage of another device (step S13).

The usage information generation section 95 can also generate for each content as content usage information 99; for instance, usage rankings of contents on the basis of the usage volume 123. The number of times a content is used within a predetermined period (a week, or the like) can be used as the usage volume. FIG. 17 is a table showing example rankings of content usage. The usage rankings include usage ranking information 126 that reflects rankings of usage volumes of respective contents. The content management device 90 can transmit such usage rankings to the content distribution device 11, the content reproducing device 12, and the like, by way of the network 10. By reference to usage rankings, content implementers, right holders, content users, and others, can grasp production of the next contents, popular contents, and the like.

The usage information generation section 95 can generate as the content usage information 99; for instance, information showing a volume of contents transmitted, for each source corresponding to source information about an identified content. Specifically, the usage information generation section 95 collects contents originating from the same source by reference to the content usage information shown in FIGS. 15 and 17 to thereby be able to generate information about the volume of contents transmitted from the same source. A content distribution entity that is the source can utilize the information for measuring popularity of contents owned by the distribution entity. The source of a content is ascertained from the source information 36 in the header 32 of the content packet 31.

When acquired a predetermined volume of specific packet route information or more within a predetermined period, the route information acquisition section 93 may also generate an additional route information change command for changing additional route information in specific packet route information and transmit the generated command to a source of content data corresponding to the specific packet route information. When a predetermined volume of specific content packet or more is transmitted over a specific route, a transmission route can be changed by means of above operation while a content is simultaneously identified. Thus, it becomes possible to take action to lessen an increase in traffic of the packet route, and the like.

Moreover, so long as the content management device 90 is disposed at a position close to the content user, it will become possible to grasp; for instance, regional usage situation of a content. In this case, the content management device 90 is placed at; for instance, each of predetermined locations. By means of route information about the content management devices 90 disposed at the respective locations, a specific content is identified, and regions where there are situated the content reproducing devices 12 that are destinations and that use the content are identified. It thereby becomes possible to acquire information showing a usage situation of a content including destination information, such as calculation of a regional audient share.

Figure 18:
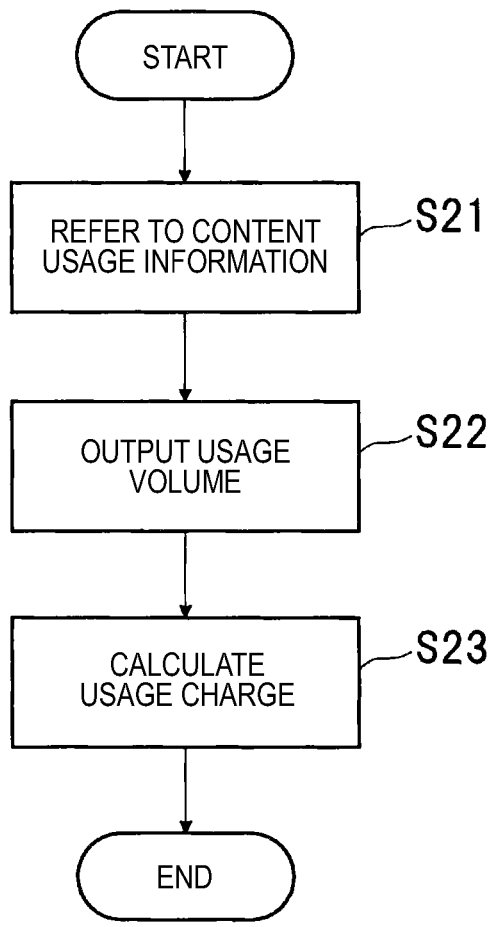
FIG. 18 is a flowchart showing procedures of the content management device of the embodiment showing processing pertaining to copy right management.

FIG. 18 is a flowchart showing procedures of the content management device of the embodiment showing processing pertaining to copy right management. In the management processing section 92 of the content management device 90, the copy right management processing section 96 acquires usage information about a target content by reference to the content usage information 99 (step S21). The copy right management processing sections 96 outputs information about a usage volume of the target content in the content usage information 99 (step S22). Next, the copy right management processing section 96 calculates a usage charge corresponding to a royalty commensurate with the volume of usage of a content (step S23). By means of information about the usage charge, it is possible to perform processing for paying a royalty to a right holder of each content, billing a usage charge to a content user, and the like.

Processing pertaining to identification of a content and generation of usage information shown in FIG. 16 and processing pertaining to copy right management shown in FIG. 18 can be combined to each other. For instance, when the route information acquisition section 93 has acquired a predetermined volume of specific packet route information or more within a predetermined period (a week, or the like), such packet route information is acquired through processing pertaining to step S11 shown in FIG. 16. It is, at this time, desirable for the copy right management processing section 96 to manage copy right information about a content corresponding to the specific packet route information. A situation in which a predetermined volume of specific packet route information or more has been acquired within a predetermined period means an event in which a predetermined volume of specific content or more was transmitted within a predetermined period. Such an event is also conceived to be attributable to illegal transmission of the specific content. Hence, management of the copy right information is desirable.

Further, it is preferable that the copy right management processing section 96 will compare previously-held packet route information with packet route information first acquired by the route information acquisition section 93, thereby managing copy right information about a content corresponding to the initially-acquired packet route information. Although the information held by the content-route correspondence information 76 can be adopted as the previously-held packet route information, the packet route information is not specifically limited to the held information. Moreover, the route information acquisition section 93 can determine information not held in the content-route correspondence information 76, among pieces of the acquired packet route information, as information equivalent to the first acquired packet route information. However, the determination method is not particularly limited either.

The so-called initially-acquired packet route information is information corresponding to a non-registered content. Managing copy right information about such a content is also preferable in view of monitoring of illegal transmission. Determining whether or not communication data are a target content must be made as a precondition for determining whether or not the packet route information is initially-acquired packet route information. Such a determination can be made on the basis of management information about a high-level layer (identification information about a content, digital watermarking information, or the like).

Figure 19A:
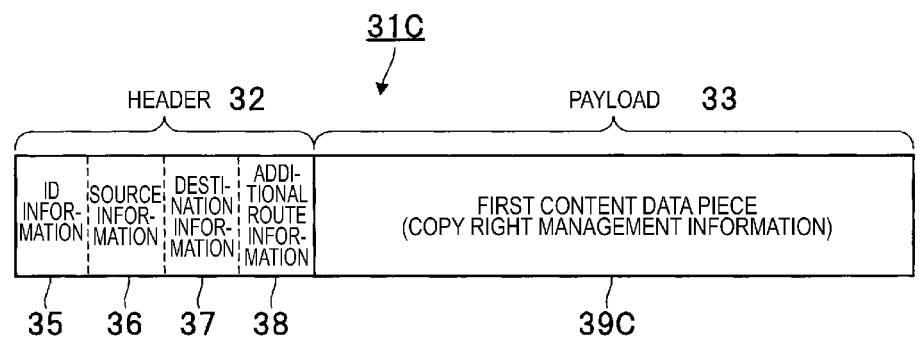
FIG. 19A is an example configuration of a content packet piece used in the embodiment of the present invention.
Figure 19B:
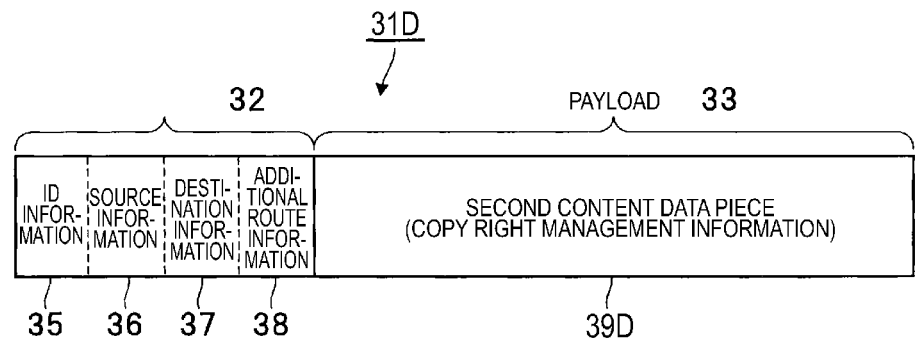
FIG. 19B is an example configuration of another content packet piece used in the embodiment of the present invention.

Another usage method is now described. As shown in FIGS. 19A and 19B, when the volume of a single content is too large, the content is sometimes divided into two content packet pieces 31C and 31D, and they are transmitted along different routes. The two content packet pieces 31C and 31D include a first content packet piece 31C and a second content packet piece 31D. The content packet piece 31C includes a first content data piece 39C, and the content packet piece 31D includes a second content data piece 39D.

The route information acquisition section 93 acquires the two content packet pieces 31C and 31D corresponding to the single content. On this occasion, the content identification section 94 identifies the single content corresponding to pieces of packet route information included respectively in the plurality of content packet pieces 31C and 31D. The copy right management processing section 96 can also execute processing pertaining to management of a copy right of the identified single content. No particular limitations are imposed on a method for identifying that a plurality of content packet pieces correspond to a single content. In the present embodiment, the two content packet pieces are identical with each other in terms of the ID information 35, the source information 36, the destination information 37, and the additional route information 38. Hence, the content identification section 94 can identify correspondence between the single content and the plurality of content packet pieces 31C and 31D. Although the present embodiment has been described in connection with an example in which a single content is divided into two content packet pieces, the present invention is still applicable to a case where a single content is divided into a plurality of content packet pieces; namely, three content packet pieces or more.

Figure 20:
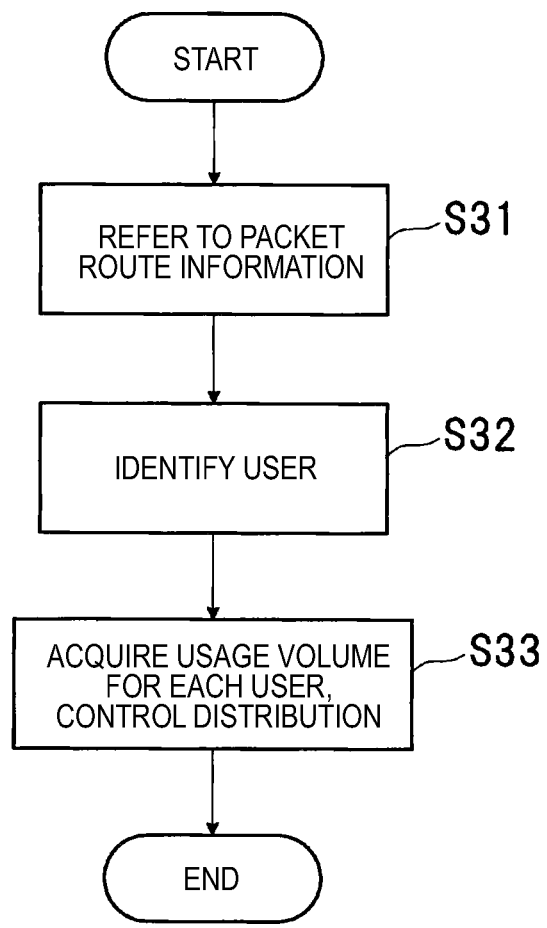
FIG. 20 is a flowchart showing procedures of user management processing of the content management device of the embodiment.

FIG. 20 is a flowchart showing procedures of user management processing of the content management device of the embodiment. In the management processing section 92 of the content management device 90, the user management processing section 97 makes a reference to the acquired packet route information (step S31), thereby identifying a specific user corresponding to the packet route information according to previously-set user-route correspondence information (step S32). The user management processing section 97 acquires a usage volume for each user, thereby performing management processing fitting each user, like content distribution control (step S33).

Figure 21:
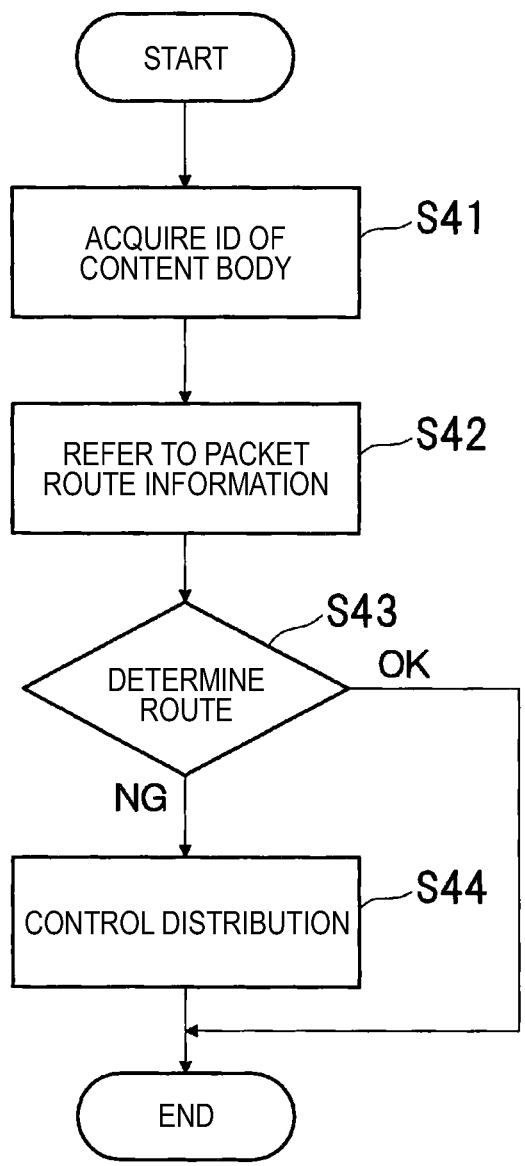
FIG. 21 is a flowchart showing procedures of content route management processing of the content management device of the embodiment.

FIG. 21 is a flowchart showing procedures of content route management processing of the content management device of the embodiment. In the management processing section 92 of the content management device 90, the content route management processing section 98 makes a reference to content data in the content packet, thereby acquiring ID information about a content body (step S41). The content route management processing section 98 makes a reference to the acquired packet route information (step S42), thereby performing route identification as to whether or not a match exists between the packet route information about the content packet and the content route information corresponding to ID information about the content body (step S43). When the match exists (OK in step S43), the content is determined to be valid, whereupon processing is terminated. When the match does not exist (NG in step S43), the content is determined to be invalid. The relay, or the like, performs distribution control processing, like imposing a restriction on content transmission (step S44).

As mentioned above, according to the embodiment, packet route information included in a content packet, such as an IP packet is acquired. By reference to the acquired packet route information and preset content-route correspondence information showing correlation between a content and its route, a specific content corresponding to the packet route information can be identified. On this occasion, so long as the packet transmission route and the content have been correlated with each other in advance, a content packet that passes through a specific route and that has specific packet route information can be deemed to be a specific content. Further, transmission of a specific content can be recognized by means of transmission of this content packet. Consequently, a transmission route of a content packet is acquired, and a content is discriminated by identification. The volume of the identified specific content packet transmitted and the number of times the content packet is transmitted are acquired. The usage volume of the target content can be acquired through calculation from a correlation between the size of each piece of content data and a packet size. In this case, as a result of use of the packet route information stored in the header of the content packet, the essential requirement for the content management device and the relay is to process only the header. A content can be identified and managed without involvement of processing of a content body in a payload performed by the content management device.

As mentioned above, identifying the packet route information about a content packet makes it possible to perform content management, such as grasping of a usage situation of a content, or the like. Moreover, user management, content distribution control, or the like, involving use of route information, are also possible. At this time, it is possible to construct a general-purpose system by applying packet route information to a general-purpose network, like an IP network, and handling the packet route information at an IP packet level in a lower hierarchical layer of the network. Employing route information about an IP packet specified by RFC (Request for Comments) in the IP network makes it possible to hold packet route information even in a configuration in which a packet goes through an open network and a configuration in which a plurality of different networks are connected. Thus, the content management device can identify and manage a content. Therefore, in a versatile network system, like a widely-proliferated common IP network, a usage situation of a content can be grasped. In this case, content management does not necessarily require adding of management information to content data themselves or use of a technique, such as employment of a custom-designed program or protocol. For these reasons, restrictions on a hardware configuration, a software configuration, a system configuration, or the like, can significantly be lessened. The content management device can readily be applied to various usage patterns, so that a range of application of content management can be broadened.

It is also possible to grasp a usage situation of a content and manage various copy rights, such as generation of information showing a usage volume of a specific content and calculation of a usage charge corresponding to a royalty commensurate with a usage volume. Specifically, copy right management processing can be performed by using packet route information about a content packet as copy right information. Moreover, in the present embodiment, packet route information, such as a general-purpose protocol, like an IP packet, is used. Hence, the packet route information can readily, flexibly be combined with copy right management processing based on a protocol or program of a high level hierarchical layer of a network; for instance, DRM. Consequently, appropriate copy right management commensurate with situations can be implemented without undergoing great restrictions, like a system configuration.

Arbitrary combinations of the constituent elements exemplified in the embodiment are also available. Content management using the route information described in connection with the embodiment can also be applied, as necessary, to content management processing other than copy right management. The content distribution device, the relay, and the content management device of the embodiment can be configured such that capabilities of a plurality of devices are grouped into one device; such that capabilities of one device are distributed into a plurality of separate devices; or such that processing pertaining to capabilities are distributed. Thus, the respective capabilities can be implemented by means of various configurations.

Various modes of the embodiment of the present invention include the followings:

a content management device that manages a usage situation of a content which is transmitted over a network as a content packet into which content data including a content are packetized, the device comprising:

a route information acquisition section that acquires packet route information including, as information that is included in the content packet and that shows a packet transmission route in the network, at least any one of source information including address information about a packet source and additional route information including address information about a relay point in the packet transmission route; and a content identification section that identifies a specific content corresponding to packet route information according to the acquired packet route information and preset content-route correspondence information showing a correlation between a content and a route.

In the content management device, the content packet includes in its header the source information, destination information, and the additional route information; and the route information acquisition section acquires, as packet route information, at least any one of the source information and the additional route information stored in the header of the content packet.

In the content management device, the additional route information used as the packet route information includes at least any one of actual transmission route information showing a transmission route along which a packet has actually been transmitted, designated route information for designating a packet transmission route, and route control information for guiding a packet transmission route.

In the content management device, the additional route information used as the packet route information includes address information about a source and at least one relay in the packet transmission route.

In the content management device, the network is an IP network capable of performing packet communication utilizing an IP (Internet Protocol); the content packet is an IP packet transmitted over the IP network; and the route information acquisition section acquires, as packet route information, at least any one of the source information and the additional route information included in a header of the IP packet.

In the content management device, the content packet is a packet that is transmitted through communication using a TCP (Transmission Control Protocol) or a UDP (User Datagram Protocol) intended for the IP network.

In the content management device, the route information acquisition section acquires additional route information stored in an optional field of a header of an IPV4 packet or an extension header of a header of an IPv6 packet.

In the content management device, the route information acquisition section acquires information about an IP address as address information of the packet route information.

In the content management device, the route information acquisition section acquires information about an IP address and a port as address information of the packet route information.

In the content management device, the content-route correspondence information includes content route information set in correspondence with a specific content and ID information for identifying a content; and the content identification section extracts ID information about a content corresponding to the packet route information by use of the content-route correspondence information.

The content management device further includes a usage information generation section that generates content usage information about the identified content from an identification result of the content.

In the content management device, the usage information generation section generates, as the content usage information, information showing a usage volume for each content.

In the content management device, the usage information generation section generates, as the content usage information, information showing a volume of content utilized that includes at least any of the number of times a content is distributed, the volume of information, the number of times a content is used, and the usage time of a content.

The content management device further includes a copy right management processing section that performs processing pertaining to management of a copy right of the identified content, according to a result of identification of the content.

In the content management device, the copy right management processing section generates, as copy right management processing, information showing a volume of usage of a content corresponding to a specific copy right.

In the content management device, the copy right management processing section performs, as copy right management processing, processing for calculating a usage charge corresponding to a royalty commensurate with a volume of usage of a content by use of the content usage information.

The content management device further includes a user management processing section that performs processing pertaining to content user management by identifying a user corresponding to packet route information according to a result of identification of the content and preset user-route correspondence information showing a correlation between a content user and a route.

In the content management device, the user management processing section performs, as user management processing, processing pertaining to at least any one of identification of a user of a content reproducing device, content distribution control for each user, acquisition of a volume of usage of a content for each user, and calculation of a usage charge of a content for each user, according to a result of identification of the user.

In the content management device, the content-route correspondence information includes ID information about a content body and content route information set in correspondence with a specific content. The content management device further includes a content route management processing section that performs distribution control processing based on packet route information by reference to the packet route information about the identified content and the ID information about a content body.

In the content management device, when a match does not exist between packet route information about the identified content and content route information corresponding to the ID information about the content body, the content route management processing section performs processing for limiting transmission of a corresponding content packet.

There is provided a program for letting a computer implement capabilities of the foregoing respective sections of the content management device.

There is provided a content management method for use with a content management device that manages a usage situation of a content which is transmitted over a network as a content packet into which content data including a content are packetized, the method comprising:

a step of acquiring packet route information including, as information showing a packet transmission route in the network, at least any one of source information including address information about a packet source and additional route information including address information about a relay point in the packet transmission route, by reference to the content packet transmitted over the network included in the content packet; and a step of identifying a specific content corresponding to packet route information according to the acquired packet route information and preset content-route correspondence information showing a correlation between a content and a route.

There is provided a program for letting a computer implement processing pertaining to procedures of respective steps in the content management method.

There is provided a content distribution device that distributes a content which is transmitted over a network as a content packet into which content data including a content are packetized, the device comprising:

a distribution control section that transmits a content packet packetized by including content data including a target content to be distributed, to a predetermined destination;

a route information setting section that sets, in the header of the content packet as information for specifying a route for a specific packet corresponding to the content packet, route information including address information about at least any one of a source and a relay point in a packet transmission route; and an output section that outputs the content packet.

In the content distribution device, the route information setting section sets, as the packet route information, information including at least any one of source information including address information about a packet source and additional route information including address information about a relay point in the packet transmission route.

In the content distribution device, when setting the additional route information as the packet route information, the route information setting section sets information including at least any one of designated route information for designating a packet transmission route and route control information for guiding packet transmission route.

In the content distribution device, when setting the additional route information as the packet route information, the route information setting section sets information including address information about a source and at least one relay point in the packet transmission route.

In the content distribution device, the route information setting lock sets, as address information of the packet route information, information about an IP address.

In the content distribution device, the route information setting section sets, as address information of the packet route information, information about an IP address and a port.

In the content distribution device, the route information setting lock sets the packet route information according to preset content-route correspondence information showing a correlation between a content and a route.

In the content distribution device, the content-route correspondence information includes content route information set in correspondence with a specific content and ID information for identifying a content, and the route information setting section sets packet route information for specifying a route for a specific packet corresponding to a content by use of the content-route correspondence information.

There is provided a program for letting a computer implement capabilities of the respective sections in any of the content distribution device.

There is provided a content distribution method for use with a content distribution device that distributes a content which is transmitted over a network as a content packet into which content data including a content are packetized, the device comprising:

a step of transmitting a content packet packetized by including content data including a target content to be distributed, to a predetermined destination;

a step of setting, in the header of the content packet as information for specifying a route for a specific packet corresponding to the content, packet route information including address information about at least any one of a source and a relay point in a packet transmission route; and a step of outputting the content packet to the network.

There is provided a program intended for letting a computer implement processing pertaining to procedures of respective steps in the content distribution method.

There is provided a content relay that relays a content which is transmitted over a network as a content packet into which content data including a content are packetized, the relay comprising:

an input/output section that performs inputting/outputting of the content packet;

a route control section that controls transmission of the content packet to a destination on a predetermined route according to destination information stored in a header of the received content packet and route control information previously set in the content relay; and a route information adding section that imparts, as packet route information showing a packet transmission route in the network, information including address information about a relay point of the relay to the header of the content packet.

In the content relay, the packet route information includes at least any one of source information including address information about a packet source and additional route information including address information about a relay point in a packet transmission route; and the route information adding section imparts, as the packet route information, additional route information including address information including a relay point of the content relay.

In the content relay, the additional route information used as the packet route information includes at least any one of actual transmission route information showing a transmission route along which a packet has been actually transmitted, designated route information for designating a packet transmission route, and route control information for guiding the packet transmission route; and the rote information adding section imparts address information about a relay point of the content relay as additional route information equivalent to the actual transmission route information.

In the content relay, the route information adding section imparts information about an IP address as the address information of the packet route information.

In the content relay, the route information adding section imparts information about an IP address and a port as the address information of the packet route information.

In the content relay, the route control section performs control operation for transmitting the content packet to a destination on a predetermined route according to the packet route information stored in the header of the content packet.

In the content relay, the packet route information used by the route control section includes at least any one of source information including address information about a packet source and additional route information including address information about a relay point in the packet transmission route; and, wherein when the additional route information is included, the additional route information includes at least any one of actual transmission route information showing a transmission route along which a packet has been actually transmitted, designated route information for designating a packet transmission route, and route control information for guiding the packet transmission route.

There is provided a content relay that relays a content which is transmitted over a network as a content packet into which content data including a content are packetized, the relay comprising:

an input/output section that performs inputting and outputting of the content packet; and a route control section that controls transmission of the content packet to a destination on a predetermined route according to destination information stored in a header of the received content packet and packet route information showing a packet transmission route in the network.

In the content relay, the packet route information used by the route control section includes at least any one of source information including address information about a packet source and additional route information including address information about a relay point in the packet transmission route; and, wherein when the additional route information is included, the additional route information includes at least any one of actual transmission route information showing a transmission route along which a packet has been actually transmitted, designated route information for designating a packet transmission route, and route control information for guiding the packet transmission route.

In the content relay, the route control section performs control operation for transmitting a content packet to a destination on a predetermined route according to the destination information, the packet route information, and route control information previously set in the content relay.

In the content relay, the route control section acquires information about an IP address as address information of the packet route information.

In the content relay, the route control section acquires information about an IP address and a port as address information of the packet route information.

There is provided a program for letting a computer implement capabilities of the foregoing respective sections in any of the content relays.

There is provided a content relaying method for use in a content relay that relays a content which is transmitted over a network as a content packet into which content data including a content are packetized, the method comprising:

a step of inputting and outputting the content packet to the network;

a step of controlling transmission of the content packet to a destination on a predetermined route according to destination information stored in a header of the received content packet and route control information previously set in the content relay; and a step of adding, as packet route information showing a packet transmission route in the network, information including address information about a relay point of the relay to the header of the content packet.

There is provided a content relaying method for use in a content relay that relays a content which is transmitted over a network as a content packet into which content data including a content are packetized, the method comprising:

a step of inputting and outputting the content packet to the network; and a step of controlling transmission of the content packet to a destination on a predetermined route according to destination information stored in a header of the received content packet and packet route information showing a packet transmission route in the network.

There is provided a program for letting a computer execute processing pertaining to procedures of respective steps of the content relaying method.

The present invention is also predetermined to be subjected to various alterations and applications conceived by the persons skilled in the art according to the descriptions of the present patent specification and the well-known techniques without departing the spirit and scope of the present invention. The modifications and the applications fall within a range where protection of the present invention is sought.

The present patent application is based on Japanese Patent Application (JP-2009-146705) filed on Jun. 19, 2009, the entire subject matter of which is incorporated herein by reference.

DESCRIPTIONS OF THE REFERENCE NUMERALS AND SYMBOLS 10, 20 . . . NETWORK
11 . . . CONTENT DISTRIBUTION DEVICE
12 . . . CONTENT REPRODUCING DEVICE
15 . . . CONTENT MANAGEMENT DEVICE
16, 17, 18 . . . RELAY
30 . . . CONTENT DATA
31, 31A, 31B . . . CONTENT PACKET
32, 32A, 32B . . . HEADER
33 . . . PAYLOAD
34, 34A, 34B . . . PACKET ROUTE INFORMATION
35 . . . ID INFORMATION
36 . . . SOURCE INFORMATION

37 ... DESTINATION INFORMATION
38 ... ADDITIONAL ROUTE INFORMATION
39 ... CONTENT DATA
51, 61 ... IP PACKET
52, 62 ... HEADER
53, 63 ... PAYLOAD
54, 64 ... ADDITIONAL ROUTE INFORMATION
56, 66 ... SOURCE ID ADDRESS
57, 67 ... DESTINATION IP ADDRESS
58, 68 ... DATA BODY
59 ... OPTIONAL FIELD
69 ... EXTENSION HEADER
70 ... CONTENT DISTRIBUTION DEVICE
71 ... INPUT/OUTPUT INTERFACE
72 ... DISTRIBUTION PROCESSING SECTION
73 ... DISTRIBUTION PROCESSING SECTION
74 ... ROUTE INFORMATION SETTING SECTION
75 ... CONTENT DATA
76 ... CONTENT-ROUTE CORRESPONDENCE INFORMATION
80 ... RELAY
81, 82 ... NETWORK INTERFACE
83 ... COMMUNICATION CONTROL SECTION
84 ... ROUTE CONTROL SECTION
85 ... ROUTE INFORMATION ADDING SECTION
90 ... CONTENT MANAGEMENT DEVICE
91 ... INPUT/OUTPUT INTERFACE
92 ... MANAGEMENT PROCESSING SECTION
93 ... ROUTE INFORMATION ACQUISITION SECTION
94 ... CONTENT IDENTIFICATION SECTION
95 ... USAGE INFORMATION GENERATION SECTION
96 ... COPY RIGHT MANAGEMENT PROCESSING SECTION
97 ... USAGE MANAGEMENT PROCESSING SECTION
98 ... CONTENT ROUTE MANAGEMENT PROCESSING SECTION
99 ... CONTENT USAGE INFORMATION
111 ... CONTENT ROUTE INFORMATION
112 ... CONTENT ID
113 ... CONTENT-RELATED INFORMATION
114 ... CONTENT DATA SIZE
121 ... CONTENT ID
122 ... CONTENT INDEX INFORMATION
123 ... USAGE VOLUME
124 ... TIME INFORMATION
125 ... COPY RIGHT INFORMATION

The invention claimed is:

1. A content management device that manages a usage situation of a digital content which is transmitted over a network as a content packet into which content data including a digital content are packetized, the device comprising:
a route information acquisition section that acquires packet route information including, as information that is included in the content packet and that shows a packet transmission route in the network, at least any one of source information including address information about a packet source and additional route information including address information about a relay point in the packet transmission route; and
a content identification section that identifies a specific digital content corresponding to the at least one of the source information and the additional route information, with reference to the acquired packet route information and preset content-route correspondence information showing a correlation between a digital content and a route, wherein
the content-route correspondence information includes content route information and content ID information which are set in correspondence with the specific digital content, and
the content identification section identifies the specific digital content by extracting the content ID information about the specific digital content from the content-route correspondence information with reference to the acquired packet route information and the content route information in the content-route correspondence information.

2. The content management device according to claim 1, wherein the content packet includes in its header the source information, destination information, and the additional route information; and wherein the route information acquisition section acquires, as packet route information, at least any one of the source information and the additional route information stored in the header of the content packet.

3. The content management device according to claim 1, wherein the additional route information used as the packet route information includes at least any one of actual transmission route information showing a transmission route along which a packet has actually been transmitted, designated route information for designating a packet transmission route, and route control information for guiding a packet transmission route.

4. The content management device according to claim 1, wherein the
network is an IP network capable of performing packet communication utilizing an IP (Internet Protocol);
wherein the content packet is an IP packet transmitted over the IP network; and
wherein the route information acquisition section acquires, as packet route information, at least any one of the source information and the additional route information included in a header of the IP packet.

5. The content management device according to claim 4, wherein the route information acquisition section acquires information about an IP address as address information of the packet route information.

6. The content management device according to claim 4, wherein the route information acquisition section acquires information about an IP address and a port as address information of the packet route information.

7. The content management device according to claim 1, further includes a usage information generation section that generates content usage information about the identified content from an identification result of the content.

8. The content management device according to claim 7, wherein the usage information generation section generates, as the content usage information, information showing a usage volume of each content.

9. The content management device according to claim 8, wherein the usage information generation section generates a usage ranking of a content from the usage volume of each content serving as the content usage information.

10. The content management device according to claim 7, wherein the usage information generation section generates, as the content usage information, information showing a volume of content transmitted for each source corresponding to source information about the identified content.

11. The content management device according to claim 1, further comprising a copy right management processing section that performs processing pertaining to management of a copy right of the identified content, according to a result of identification of the content.

12. The content management device according to claim 11, wherein, when the route information acquisition section has acquired a predetermined volume of specific packet route information or more within a predetermined period, the copy right management processing section manages copyright information about a content corresponding to the specific packet route information.

13. The content management device according to claim 1, wherein, when the route information acquisition section has acquired a plurality of content packet pieces corresponding to a single content, the content identification section identifies the single content corresponding to packet route information pieces included in each of the content packet pieces.

14. The content management device according to claim 11, wherein, when the route information acquisition section has acquired a plurality of content packet pieces corresponding to a single content, the content identification section identifies the single content corresponding to a packet route information piece included in each of the plurality of content packet pieces; and wherein the copy right management processing section performs processing pertaining to copy right management of the identified single content.

15. The content management device according to claim 1, wherein, when the route information acquisition section has acquired a predetermined volume of specific packet route information or more within a predetermined period, the route information acquisition section transmits an additional route information change command stating that additional route information in the specific packet route information is changed, to a source of content data corresponding to the specific packet route information.

16. The content management device according to claim 1, further comprising a user management processing section that identifies a user corresponding to packet route information according to a result of identification of the content and the preset user-route correspondence information showing a correlation between a content user and a route and that performs processing for managing a content user.

17. The content management device according to claim 1, wherein the content-route correspondence information includes ID information about a content body and content route information set in correspondence with a specific content; and wherein the content management device further includes a content route management processing section that performs distribution control processing based on packet route information by reference to the packet route information about the identified content and the ID information about a content body.

18. A program for letting a computer implement capabilities of the foregoing respective sections of the content management device defined in claim 1.

19. The content management device according to claim 1, wherein said digital content is reproducible by a reproducing device or displayable on a display.

20. The content management device according to claim 1, wherein a header of the content packet comprises the address information of the source, address information of the destination, and the address information of the relay point.

21. A content management method for use with a content management device that manages a usage situation of a digital content which is transmitted over a network as a content packet into which content data including a digital content are packetized, the method comprising:

a step of acquiring packet route information including, as information showing a packet transmission route in the network, at least any one of source information including address information about a packet source and additional route information including address information about a relay point in the packet transmission route, by reference to the content packet transmitted over the network included in the content packet; and a step of identifying a specific content corresponding to the at least one of the source information and the additional route information, with reference to the acquired packet route information and preset content-route correspondence information showing a correlation between a digital content and a route, wherein the content-route correspondence information includes content route information and content ID information which are set in correspondence with the specific digital content, and the specific digital content is identified by extracting the content ID information about the specific digital content from the content-route correspondence information with reference to the acquired packet route information and the content route information in the content-route correspondence information.

22. A program for letting a computer implement processing pertaining to procedures of respective steps in the content management method defined in claim 21.

23. The content management method according to claim 21, wherein a header of the content packet comprises the address information of the source, address information of the destination, and the address information of the relay point.

24. A content distribution device that distributes a digital content which is transmitted over a network as a content packet into which content data including a digital content are packetized, the device comprising:

a distribution control section that transmits a content packet packetized by including content data including a target content to be distributed, to a predetermined destination;

a route information setting section that sets, in the header of the content packet as information for specifying a route for a specific packet corresponding to the digital content to be distributed, and for corresponding to preset content-route correspondence information showing a correlation between a digital content and a route, packet route information including address information of a source, address information of a destination, and address information of a relay point in a packet transmission route; and an output section that outputs the content packet.

25. The content distribution device according to claim 24, wherein the route information setting section sets the packet route information according to preset content-route correspondence information showing a correlation between a content and a route.

26. A program for letting a computer implement capabilities of the respective sections in the content distribution device defined in claim 24.

27. A content distribution method for use with a content distribution device that distributes a digital content which is transmitted over a network as a content packet into which content data including a digital content are packetized, the method comprising:

a step of transmitting a content packet packetized by including content data including a target content to be distributed, to a predetermined destination;

a step of setting, in the header of the content packet as information for specifying a route for a specific packet corresponding to the digital content to be distributed, and for corresponding to preset content-route correspondence information showing a correlation between a digital content and a route, packet route information including address information of a source and address information of a relay point in a packet transmission route; and a step of outputting the content packet to the network.

28. A program for letting a computer implement processing pertaining to procedures of respective steps in the content distribution method defined in claim 27.

29. The content distribution method according to claim 27, wherein the packet route information further includes address information of a destination.

30. A content relay that relays a content which is transmitted over a network as a content packet into which content data including a content are packetized, the relay comprising:
    an input/output section that performs inputting/outputting of the content packet;
    a route control section that controls transmission of the content packet to a destination on a predetermined route according to destination information stored in a header of the received content packet and route control information previously set in the content relay; and
    a route information adding section that imparts, as packet route information showing a packet transmission route in the network, information including address information of a relay point of the relay to the header of the content packet such that the header of the content packet includes address information of a source, address information of a destination, and the address information of the relay point.

31. The content relay according to claim 30, wherein the route control section further performs control operation for transmitting the content packet to a destination on a predetermined route according to the packet route information stored in the header of the content packet.

32. A program for letting a computer implement capabilities of the respective sections in the content relay defined in claim 30.

33. A content relay that relays a digital content which is transmitted over a network as a content packet into which content data including a digital content are packetized,
    wherein the content includes packet route information showing a packet route in the network in the header of the content packet as information for specifying a route for a specific packet corresponding to the digital content to be distributed, and for corresponding to preset content-route correspondence information showing a correlation between a digital content and a route,
    wherein the relay comprises:
    an input/output section that performs inputting and outputting of the content packet; and
    a route control section that controls transmission of the content packet to a destination on a predetermined route according to destination information stored in a header of the received content packet and packet route information showing a packet route in the network,
    wherein the header comprises address information of a source, address information of the destination, and the address information of the content relay.

34. A program for letting a computer implement capabilities of the respective sections in the content relay defined in claim 33.

35. A content relaying method for use in a relay that relays a digital content which is transmitted over a network as a content packet into which content data including a digital content are packetized, the method comprising:
    a step of inputting and outputting the content packet to the network;
    a step of controlling transmission of the content packet to a destination on a predetermined route according to destination information stored in a header of the received content packet and route control information previously set in the content relay; and
    a step of adding, as information for specifying a route for a specific packet corresponding to the digital content to be distributed, and for corresponding to preset content-route correspondence information showing a correlation between a digital content and a route and packet route information showing a packet transmission route in the network, information including address information about a relay point of the relay to the header of the content packet such that the header of the content packet includes address information of a source, address information of a destination, and the address information of the relay point.

36. A program for letting a computer execute processing pertaining to procedures of respective steps of the content relaying method defined in claim 35.

37. A content relaying method for use in a relay that relays a digital content which is transmitted over a network as a content packet into which content data including a digital content are packetized,
    wherein the content includes packet route information showing a packet route in the network in the header of the content packet as information for specifying a route for a specific packet corresponding to the digital content to be distributed, and for corresponding to preset content-route correspondence information showing a correlation between a digital content and a route,
    wherein the method comprises:
    a step of inputting and outputting the content packet to the network; and
    a step of controlling transmission of the content packet to a destination on a predetermined route according to destination information stored in a header of the received content packet and packet route information showing a packet transmission route in the network, and
    wherein the header comprises address information of a source, address information of the destination, and the address information of the relay.

38. A program for letting a computer execute processing pertaining to procedures of respective steps of the content relaying method defined in claim 37.

\* \* \* \* \*